(12) United States Patent
Muruganathan et al.

(10) Patent No.: US 10,880,059 B2
(45) Date of Patent: Dec. 29, 2020

(54) MULTIPLE CSI REPORTS FOR MULTI-USER SUPERPOSITION TRANSMISSION

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Robert Mark Harrison, Grapevine, TX (US); Bo Lincoln, Lund (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 15/752,519

(22) PCT Filed: Aug. 15, 2016

(86) PCT No.: PCT/SE2016/050756
§ 371 (c)(1),
(2) Date: Feb. 13, 2018

(87) PCT Pub. No.: WO2017/030490
PCT Pub. Date: Feb. 23, 2017

(65) Prior Publication Data
US 2019/0013911 A1 Jan. 10, 2019

(30) Foreign Application Priority Data
Aug. 14, 2015 (WO) ................ PCT/CN2015/087073

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS

| 2010/0142642 A1* | 6/2010 | Lee ........................ H04L 1/0026 375/295 |
| 2011/0032839 A1 | 2/2011 | Chen et al. |
| 2018/0220399 A1* | 8/2018 | Davydov .............. H04L 1/0026 |

FOREIGN PATENT DOCUMENTS

WO 2016180346 A1 11/2016

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, Mar. 2015, 1-136.
(Continued)

*Primary Examiner* — Alex Skripnikov
(74) *Attorney, Agent, or Firm* — Murphy, Bilak & Homilier, PLLC

(57) ABSTRACT

According to an aspect, a radio access network node supports the transmission of multi-user superposition transmissions, where multi-user superposition transmission comprises transmitting, in each of a plurality of time-frequency resource elements, a modulation symbol intended for a first UE and a modulation symbol intended for a second UE, using the same antennas and the same antenna precoding. The radio access network node receives multiple CSI reports from the first UE for a first reporting instance. One or more of the received multiple CSI reports correspond to one or more respective multi-user superposition transmission
(Continued)

states. The radio access network node also determines whether to use multi-user superposition transmission or an orthogonal multiple access transmission for scheduling the first UE in a first scheduling interval, based on the received multiple CSI reports.

29 Claims, 13 Drawing Sheets

(51) Int. Cl.
*H04L 1/00* (2006.01)
*H04L 27/34* (2006.01)
*H04B 7/0456* (2017.01)
*H04B 7/0452* (2017.01)
*H04W 52/36* (2009.01)
*H04W 72/12* (2009.01)
*H04W 88/02* (2009.01)

(52) U.S. Cl.
CPC ......... *H04B 7/0626* (2013.01); *H04B 7/0632* (2013.01); *H04B 7/0639* (2013.01); *H04L 1/0026* (2013.01); *H04L 5/006* (2013.01); *H04L 5/0037* (2013.01); *H04L 5/0057* (2013.01); *H04L 27/345* (2013.01); *H04W 52/367* (2013.01); *H04W 72/12* (2013.01); *H04B 7/063* (2013.01); *H04W 88/02* (2013.01)

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.5.0, Mar. 2015, 1-239.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 1-445.

3GPP, "3rd Generation Partnership Project; Technical Specification Group Radio Access Network; Study on Downlink Multiuser Superposition Transmission (MUST) for LTE; (Release 13)", 3GPP TR 36.859 V0.2.0, May 2015, 1-13.

Saito, Yuya et al., "Non-Orthogonal Multiple Access (NOMA) for Cellular Future Radio Access", 2013 IEEE 77th Vehicular Technology Conference (VTC Spring), Jun. 2-5, 2013, 1-5.

Unknown, Author, "Candidate non-orthogonal multiplexing access scheme", NTT DOCOMO, 3GPP TSG RAN WG1 Meeting #81, R1-153333, Fukuoka, Japan, May 25-29, 2015, 1-7.

Unknown, Author, "Candidate schemes for superposition transmission", Huawei, HiSilicon, 3GPP TSG RAN WG1 meeting 81, R1-152493, Fukuoka, Japan, May 25-29, 2015, 1-11.

Unknown, Author, "Downlink Multiuser Superposition Transmission Scheme Document for: Discussion and Decision", 3GPP TSG RAN WG1 Meeting #81, R1-153044, Fukuoka, Japan, May 25-29, 2015, 1-5.

Unknown, Author, "Estimation of extended PMI feedback signalling required for user intra-cell and inter-cell coordination", 3GPP TSG RAN WG1 #59bis Meeting, R1-100419, Jan. 18-22, 2010, 1-5.

Unknown, Author, "Evaluation methodologies for downlink multiuser superposition transmissions", NTT DOCOMO, 3GPP TSG RAN WG1 Meeting #81, R1-153332, Fukuoka, Japan, May 25-29, 2015, 1-7.

Unknown, Author, "Evaluation Methodology for Downlink Multiuser Superposition Transmission", 3GPP TSG RAN WG1 Meeting #80bis, R1-151654, Belgrade, Serbia, Apr. 20-24, 2015, 1-8.

Unknown, Author, "Multiuser superposition schemes", Qualcomm Incorporated, 3GPP TSG RAN WG1 #80bis, R1-151425, Belgrade, Serbia, Apr. 20-24, 2015, 1-4.

Unknown, Author, "On the supported transmission modes in MUST", 3GPP TSG-RAN WG1 Meeting #81, R1-152926, Fukuoka, Japan, May 25-29, 2015, 1-7.

Unknown, Author, "System-level evaluation of MUST", 3GPP TSG-RAN WG1 Meeting #82, R1-154657, Beijing, China, Aug. 24-28, 2015, 1-4.

Unknown, Author, "TR 36.859 for Study on Downlink Multiuser Superposition Transmission", 3GPP TSG RAN WG1 Meeting #81, R1-153638, Fukuoka, Japan, May 25-29, 2015, 1-1.

Vanka, S. et al., "Superposition Coding Strategies: Design and Experimental Evaluation", IEEE Transactions on Wireless Communications, vol. 11, No. 7, Jul. 2012, 2628-2639.

* cited by examiner

1000

SEND MULTIPLE CSI REPORTS FOR A FIRST REPORTING INSTANCE, WHEREIN ONE OR MORE OF THE RECEIVED MULTIPLE CSI REPORTS CORRESPOND TO DIFFERENT POSSIBLE MULTI-USER SUPERPOSITION TRANSMISSION STATES
1002

MULTIPLE CSI REPORTS FOR MULTI-USER SUPERPOSITION TRANSMISSION

TECHNICAL FIELD

The present disclosure generally relates to communication networks, and more particularly relates to channel state information, CSI, reports for multi-user superposition transmission, or MUST.

BACKGROUND

Multi-user superposition transmission, or MUST, schemes with different flavors are being studied in the context of Long Term Evolution, LTE, Release 13. In general, MUST can be realized by superposing the data intended for different UEs at different transmit power levels in the same time-frequency resources, such as Orthogonal Frequency Division Multiplexing, OFDM, resource elements. The total power is split among the UEs served in the same time-frequency resources, where the transmit power level allocated to a given UE (or 'power share values') is generally determined by the channel condition (i.e., path loss) experienced by the UEs. For instance, UEs having higher path loss (i.e., cell edge UEs) can be allocated higher transmit power levels while UEs having lower path loss (i.e., cell center UEs) can be allocated lower transmit power share values.

FIG. 1 shows a simplified block diagram of a MUST transmitter configured to superpose transmitted symbols for two UEs. As shown in the figure, the information bits corresponding to the near UE (i.e., the cell-center UE) and those corresponding to the far UE (i.e., the cell-edge UE) are first separately channel encoded. The two sets of channel encoded bits are then jointly modulated and precoded with the appropriate transmit power level settings to produce the MUST signal. Generally, a higher transmit power level is allocated to the far UE and a lower transmit power level is allocated to the near UE. The total transmit power is kept unchanged compared to the case where all the transmit power available within a data transmission resource in a single subframe is allocated to a single UE.

FIG. 2 shows a simplified block diagram of MUST receiver processing for a case with two superposed UEs. Since the two UEs are allocated different power levels, the near UE can attempt to cancel the interference emanating from the data transmission intended to the far UE.

Typically, the far UE uses a normal receiver and need not even be aware that there is a superposed transmission to a near UE. The interference cancellation for the near UE can be done in two ways. A first option is that the codeword corresponding to the far UE is decoded at the near UE and then reconstructed and cancelled or removed from the received signal. This type of cancellation is referred to as codeword level interference cancellation, CWIC, in FIG. 2. A second option is that the near UE makes a symbol-wise hard demodulation decision of the symbols corresponding to the far UE and then cancels the interference. In FIG. 2, this type of interference cancellation is referred to as symbol level interference cancellation, SLIC.

Following the steps of interference cancellation, the near UE then decodes its own codeword(s). For certain flavors of MUST schemes, a third option is also possible where the near UE collects its own coded bits (i.e., discards the far UE coded bits) and then proceeds towards decoding its own codeword(s).

Given that the far UE is allocated a higher transmit power level than the near UE, the far UE demodulates and decodes its own codeword without cancelling the interference emanating from the data transmission intended to the near UE.

Three variants of MUST schemes are being considered in the Release 13 study item on MUST. Brief descriptions of these schemes are given below.

Non-Orthogonal Multiple Access (NOMA)

In the NOMA scheme, the information bits corresponding to the far UE and the near UE are independently encoded and modulated. Let $x_N$ and $x_F$ denote the coded modulation symbols of near UE and far UE, respectively. The symbol $x_N$ is drawn from a near UE constellation $\aleph_N$, and the symbol $x_F$ is drawn from a far UE constellation $\aleph_F$. Then the superposed symbol $x_S$ in the NOMA scheme is given by $$x_S = \sqrt{\alpha} x_N + \sqrt{1-\alpha} x_F \qquad \text{Equation 1}$$

where $0 < \alpha < 1$ represents the fraction of power allocated to the near UE. The superposed constellation $\aleph_S$ is labeled as $$s = n + f |\aleph_N| \qquad \text{Equation 2}$$

where $|\aleph_N|$ is the number of bits/symbol in the near UE constellation, n and f respectively represent the labels of the near and far constellations. An example of the superposed NOMA constellation for the case where both the near UE and far UE employ QPSK constellation is shown in FIG. 3. Since two QPSK constellations are used, the superposed constellation is similar to 16 QAM (depending on the value of a).

Semi-Orthogonal Multiple Access (SOMA) SOMA differs from the NOMA scheme in that SOMA uses Gray mapped superposed constellation. The coded modulation symbols of near UE and far UE are Gray mapped and then added together as in Equation 1. An example of the superposed SOMA constellation for the case where both the near UE and far UE employ QPSK constellation is shown in FIG. 4.

Rate-Adaptive Constellation Expansion Multiple Access (REMA)

REMA is similar to SOMA with one restriction that the resulting superposed constellation $\aleph_S$ should be a regular QAM constellation having equal horizontal and vertical spacing between constellation points (as is used in e.g. LTE). In REMA, the bits with the higher bit-level capacities are allocated for the far UE and the bits with the lower bit-level capacities are allocated for the near UE. In addition, the power sharing parameter $\alpha$ should also be set appropriately so that the resulting superposed constellation is a regular QAM constellation. There are six different ways (shown in Table 1) of realizing REMA that has LTE standard constellations as superposed constellations.

TABLE 1

REMA Superposed Constellations

| Superposed Constellation | Far UE Constellation | Near UE Constellation | Near UE Power Share α in dB |
|---|---|---|---|
| 16-QAM | QPSK | QPSK | −6.9867 dB |
| 64-QAM | QPSK | 16-QAM | −6.2342 dB |
| 64-QAM | 16-QAM | QPSK | −13.1876 dB |
| 256-QAM | QPSK | 64-QAM | −6.0730 dB |
| 256-QAM | 16-QAM | 16-QAM | −12.2915 dB |
| 256-QAM | 64-QAM | QPSK | −19.2082 dB |

System Model

When multiple antennas are used on the transmitter side, a transmit precoder, v, must be used, that defines how a symbol is transmitted from each of the multiple transmit antennas. A precoder thus contains the amplitude scaling and phase adjustment of the symbol at each of the transmit antennas. Precoding implies that beamforming gain can be achieved.

Generally, it is possible to apply different precoders to the near and far UEs in the NOMA scheme. However, in the receiver processing of the near UE in FIG. 2, the application of different precoders implies that the near UE has to acquire knowledge of the precoder applied to the far UE either via blind detection or explicit signalling. To simplify the near UE receiver processing, it is desirable to apply the same precoder to both the near and far UE.

Now assuming the application of the same precoder to both the near and far UEs, the generalized received signal model is derived for MUST schemes. It is assumed the radio access network node or eNodeB is equipped with $N_{Tx}$ transmit antennas and each UE has $N_{Rx}$ receive antennas. Assuming P to be the total transmit power per sub-carrier, let $\alpha P$ and $(1-\alpha)P$ respectively denote the transmit powers allocated to the near UE and the far UE.

For simplicity of presentation, it is assumed that each UE receives a rank-1 transmission stream. Then, the transmitted signal corresponding to the $k^{th}$ resource element, RE, can be written as $$x_S(k)=\sqrt{\alpha P}v(k)x_N(k)+\sqrt{(1-\alpha)P}v(k)x_F(k) \quad \text{Equation 3}$$

where $x_N(k)$ and $x_F(k)$ denote the coded modulation symbols of near and far UEs at the $k^{th}$ RE, respectively. Furthermore, $v(k)$ represents the $N_{Tx}$-element rank-1 precoder corresponding to the transmitted stream (note that the same precoder is applied to both UEs).

If the $N_{Rx} \times N_{Tx}$ physical channel of the near UE is represented as $H_N(k)$, then the combined channel perceived by the near UE can be written as $$g_N(k)=H_N(k)v(k). \quad \text{Equation 4}$$

The $N_{Rx}$-dimensional received signal vector corresponding to the near UE is given by $$y_N(k)=H_N(k)x_S(k)+w_N(k), \quad \text{Equation 5}$$

where $w_N(k)$ includes the noise plus inter-cell interference experienced by the near UE at the $k^{th}$ RE. Using Equation 3-Equation 4 in Equation 5, the received signal vector of the near UE can be given as $$y_N(k)=\sqrt{\alpha P}g_N(k)x_N(k)+\sqrt{(1-\alpha)P}g_N(k)x_F(k)+w_N(k). \quad \text{Equation 6}$$

In MUST schemes, the near UE can try to cancel the interference component $\sqrt{(1-\alpha)P}g_N(k)x_F(k)$, since $\alpha<0.5$. In the NOMA and SOMA schemes, the near UE can use either the CWIC or the SLIC receiver for this interference cancellation as shown in FIG. 2. Due to the regular QAM structure of REMA's superposed constellation, the near UE in the REMA case can simply use its own coded bits to decode its own codeword (see FIG. 2).

Similarly, if the $N_{Rx} \times N_{Tx}$ physical channel of the far UE is represented as $H_F(k)$, then the combined channel perceived by the far UE can be written as $$g_F(k)=H_F(k)v(k). \quad \text{Equation 7}$$

The $N_{Rx}$-dimensional received signal vector corresponding to the far UE is given by $$y_F(k)=H_F(k)x_S(k)+w_F(k), \quad \text{Equation 8}$$

where $w_F(k)$ includes the noise plus inter-cell interference experienced by the far UE at the $k^{th}$ RE. Using Equation 3 and Equation 7 in Equation 8, the received signal vector of the far UE can be given as $$y_F(k)=\sqrt{(1-\alpha)P}g_F(k)x_F(k)+\sqrt{\alpha P}g_F(k)x_N(k)+w_F(k). \quad \text{Equation 9}$$

In MUST schemes, the far UE does not cancel the interference component $\sqrt{\alpha P}g_F(k)x_N(k)$ owing to the fact that $\alpha<0.5$. Hence, the far UE's total interference and noise term is given by $\sqrt{\alpha P}g_F(k)x_N(k)+w_F(k)$. The far UE receiver processing is depicted in FIG. 2.

Channel State Information Feedback and Scheduling

In one scheme, the existing implicit channel state information, CSI, with a single CQI report per UE is used in MUST scheduling. The terminology orthogonal multiple access, OMA, is used in this scheme to refer to Orthogonal Frequency-Division Multiple Access. OFDMA, which is used in current LTE (i.e., OMA refers to both Single-User-Multiple Input Multiple Output, SU-MIMO, and Multi-User-Multiple Input Multiple Output, MU-MIMO, as currently defined in LTE). In this scheme, each UE within a cell reports a single channel quality information, CQI, assuming full transmission power is allocated to that UE during data transmission. In other words, the single CQI report from each UE assumes OMA operation. The scheduling methodology of this scheme for each scheduling band (either wideband or subband) can be summarized as follows:

Step 1: The scheduler first selects two UEs ($UE_1$ and $UE_2$) belonging to the serving cell with corresponding single CQI reports $CQI_{UE1}$ and $CQI_{UE2}$. If $CQI_{UE1}$ is sufficiently higher than $CQI_{UE2}$, then $UE_1$ is designated as the near UE and $UE_2$ is designated as the far UE. In this step, it may also be important to check the combination of precoders among these UEs when deciding that $UE_1$ and $UE_2$ can be valid MUST pairs (i.e., if $UE_1$ and $UE_2$ have reported the same precoder). This is done by comparing the two PMIs corresponding to $CQI_{UE1}$ and $CQI_{UE2}$ reported by the two UEs.

Step 2: If $UE_1$ and $UE_2$ are deemed a valid MUST pair, select a near UE power share parameter $\alpha$ from a set A of predetermined power share parameter values (i.e., $\alpha \in A$).

Step 3: For the selected a value, calculate the scheduling Signal to Interference-plus-Noise Ratios, SINRs, for MUST, $SINR_{UE1}$ and $SINR_{UE2}$, using CQI reports $CQI_{UE1}$ and $CQI_{UE2}$ with the following approximations.

$UE_1$'s scheduling SINR for MUST is calculated as $$SINR'_{UE_1}=\alpha \times SINR_{UE1} \quad \text{Equation 10}$$

$UE_2$'s scheduling SINR for MUST is calculated as $$SINR^i_{UE_2} = \frac{(1-\alpha)}{\alpha + \frac{1}{SINR_{UE2}}} \quad \text{Equation 11 1}$$

Step 4: The scheduler then calculates the MUST proportional fair (PF) metric corresponding to the MUST UE pair under consideration as $$\sum_{UE_i \in U} \left(\frac{R(i|U, \alpha)}{L(i)}\right) \quad \text{Equation 12}$$

where $R(i|U, \alpha)$ and $L(i)$ respectively denote the instantaneous throughput and the average throughput of $UE_i$. In Equation 12, $R(i|U, \alpha)$ is a function of MUST scheduling SINRs computed in Equation 10-Equation 11, and hence $R(i|U, \alpha)$ also depends on the power share parameter $\alpha$. The candidate user set U contains the MUST UE pair under consideration.

Step 5: The steps 1-4 are repeated for all valid MUST UE pairs with all power share parameter $\alpha$ values in the set A. Additionally, the OMA PF metrics corresponding to each UE belonging to the serving cell are also calculated as currently done in LTE.

Step 6: From Step 5, the scheduler decides whether OMA or MUST should be employed in the current scheduling band depending on which scheme provides the highest PF rate. The UE(s) corresponding to the highest PF metric are scheduled. In case the MUST scheme is scheduled in the scheduling band, the power share parameter value that yields the highest PF rate is chosen.

SUMMARY

One of the problems with the existing approach of relying on a single OMA CQI report per UE for MUST is the rank mismatch that could arise due to the difference in the power allocated to the UE in MUST mode when compared to the OMA mode. This problem is particularly prominent in near UEs since the near UE power share α is typically chosen to be lower than 0.5.

Consider an example near UE with good channel conditions that is allocated a power share of α=0.1 for MUST. Due to the good channel conditions, the near UE will most likely recommend a rank-2 transmission (i.e., two spatial layers) with the corresponding CQI and Precoding Matrix Indicator, PMI, in its OMA CQI report. However, in MUST mode, where the near UE is only allocated 10% of the power it gets in the OMA mode, the near UE may not be able to successfully receive a rank-2 transmission. In this case, it would have been better to schedule this near UE in MUST mode with a rank-1 transmission. The existing approach described above does not address this issue of rank mismatch.

Another related problem with the existing approach is the issue of CQI mismatch whenever there is rank mismatch between the OMA mode and the MUST mode. In the existing approach, the MUST scheduling SINRs for the near UE is derived via the simple scaling operation of Equation 10 using the reported OMA CQI. Assuming ideal interference cancellation at the near UE, such scaling is accurate only if there is no rank mismatch between the OMA mode and the MUST mode. However, if there is a rank mismatch between the OMA and MUST mode, using the approach in Equation 10 will result in a CQI mismatch. For instance, revisiting the above mentioned rank mismatch example, the OMA mode has a rank of two and the MUST mode has a rank of one. In this case, the existing approach will result in a CQI mismatch because the rank-2 CQI report (obtained from the single OMA CQI) takes into account inter-layer interference and this is not compensated for in the simple scaling operation of Equation 10.

A third problem with the existing scheme is that whenever there is rank mismatch between the OMA mode and the MUST mode, there will also likely be PMI mismatch. This could result in missed MUST pairing opportunities for MUST schemes that apply the same precoder to both the near and far UEs.

Hence, in accordance with the principles of the present invention, various embodiments are provided for allowing multiple CSI reports to be sent by the UE for the purpose of MUST. The multiple CSI reports may correspond to different data transmission power levels, different rank restrictions, or different precoders with the best and the second best measured quality CQI values. In addition, the embodiments describe different ways of using the multiple CQI reports to identify valid MUST UE pairs.

According to some embodiments, a method, in a radio access network node configured to support the transmission of multi-user superposition transmissions, where multi-user superposition transmission comprises transmitting, in each of a plurality of time-frequency resource elements, a modulation symbol intended for a first user equipment, UE, and a modulation symbol intended for a second UE, using the same antennas and the same antenna precoding, includes receiving multiple channel-state information, CSI, reports from the first UE for a first reporting instance. One or more of the received multiple CSI reports correspond to one or more respective multi-user superposition transmission states. The method also includes determining whether to use multi-user superposition transmission or an orthogonal multiple access transmission for scheduling the first UE in a first scheduling interval, based on the received multiple CSI reports.

According to some embodiments, a method, in a first UE configured to support the transmission of multi-user superposition transmissions, where multi-user superposition transmission comprises transmitting, in each of a plurality of time-frequency resource elements, a modulation symbol intended for the first UE and a modulation symbol intended for a second UE, using the same antennas and the same antenna precoding, includes sending multiple CSI reports for a first reporting instance. One or more of the received multiple CSI reports correspond to one or more respective multi-user superposition transmission states.

According to other embodiments, a method is performed by a radio access network node configured to support the transmission of multi-user superposition transmissions, where multi-user superposition transmission comprises transmitting, in each of a plurality of time-frequency resource elements, a modulation symbol intended for a first UE and a modulation symbol intended for a second UE, using the same antennas and the same antenna precoding. This method comprises receiving a CSI report from the first UE, the received CSI report being based on an assumption that a transmission power for a physical channel is lower than a minimum transmission power that is assumed when multi-user superposition transmission is not used. The method further comprises transmitting a multi-user superposition transmission to the UE, where said transmitting is based on the received CSI report.

Correspondingly, according to other embodiments, a method is performed in a UE configured to support the transmission of multi-user superposition transmissions, again where multi-user superposition transmission comprises transmitting, in each of a plurality of time-frequency resource elements, a modulation symbol intended for the first UE and a modulation symbol intended for a second UE, using the same antennas and the same antenna precoding. This method comprises receiving one or more configuration messages from a radio access network node, the one or more configuration messages directing the UE to transmit a CSI report, the one or more configuration messages comprising at least one of (a) a selected parameter indicating a ratio of a Physical Downlink Shared Channel (PDSCH) energy per resource element to a CSI reference symbol (CSI-RS) energy per resource element, wherein the selected parameter is selected from a range having a minimum value corresponding to a ratio below −8 dB, or (b) a selected parameter indicating a ratio of a PDSCH energy per resource element to a cell-specific reference symbol (CRS) energy per resource element, wherein the selected parameter is selected from an extended range having a minimum value corresponding to a ratio below −6 dB. The method further includes transmitting a CSI report, in accordance with the one or more configuration messages, and receiving a multi-user superposition transmission from the radio access network node.

Still other embodiments include a radio access network node configured to support the transmission of multi-user superposition transmissions, where the radio access network node comprises a transceiver circuit configured to send and receive transmissions; a receiving module for receiving a CSI report from the first UE, the received CSI report being based on an assumption that a transmission power for a physical channel is lower than a minimum transmission power that is assumed when multi-user superposition transmission is not used, where the transceiver circuit is configured to transmit a multi-user superposition transmission to the UE, based on the received CSI report. Likewise, other embodiments include a UE configured to support the transmission of multi-user superposition transmissions, the UE comprising a transceiver circuit configured to send and receive transmissions, including a configured to receive a multi-user superposition transmission from a radio access network node, and a receiving module for receiving one or more configuration messages from the radio access network node, the one or more configuration messages directing the UE to transmit a CSI report, the one or more configuration messages comprising at least one of (a) a selected parameter indicating a ratio of a PDSCH energy per resource element to a CSI-RS energy per resource element, wherein the selected parameter is selected from a range having a minimum value corresponding to a ratio below −8 dB, or (b) a selected parameter indicating a ratio of a PDSCH energy per resource element to a CRS energy per resource element, where the selected parameter is selected from an extended range having a minimum value corresponding to a ratio below −6 dB. The UE further comprises a sending module for sending, using the transceiver circuit, a CSI report, in accordance with the one or more configuration messages.

According to some embodiments, a radio access network node is configured to support the transmission of multi-user superposition transmissions, where multi-user superposition transmission comprises transmitting, in each of a plurality of time-frequency resource elements, a modulation symbol intended for a first UE and a modulation symbol intended for a second UE, using the same antennas and the same antenna precoding. The radio access network node includes a transceiver circuit configured to send and receive transmissions, and a processing circuit. The processing circuit is configured to receive, via the transceiver circuit, multiple CSI reports from the first UE for a first reporting instance. One or more of the received multiple CSI reports correspond to one or more respective multi-user superposition transmission states. The processing circuit is configured to determine whether to use multi-user superposition transmission or an orthogonal multiple access transmission for scheduling the first UE in a first scheduling interval, based on the received multiple CSI reports.

According to some embodiments, a first UE is configured to support the transmission of multi-user superposition transmissions, where multi-user superposition transmission comprises transmitting, in each of a plurality of time-frequency resource elements, a modulation symbol intended for the first UE and a modulation symbol intended for a second UE, using the same antennas and the same antenna precoding. The UE includes a transceiver circuit configured to send and receive transmissions, and a processing circuit. The processing circuit is configured to send, via the transceiver circuit, multiple CSI reports for a first reporting instance. One or more of the received multiple CSI reports correspond to one or more respective multi-user superposition transmission states.

According to some embodiments, computer readable storage medium and computer programs may be executed on processing circuitry to perform one or more of the above methods.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
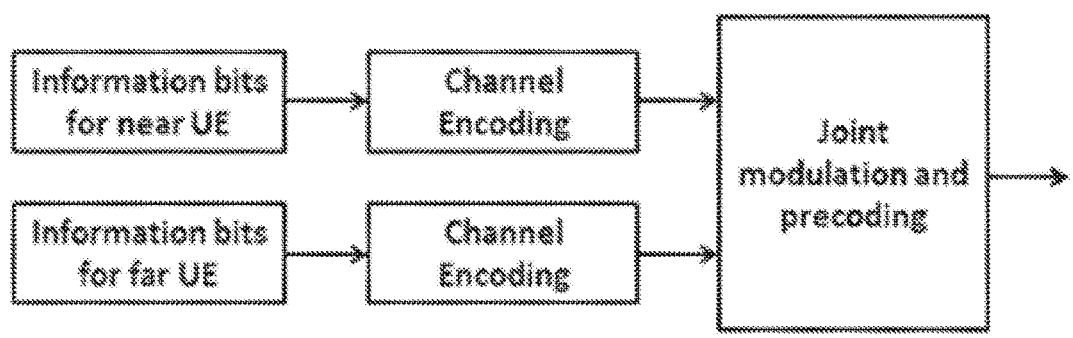
FIG. 1 is a generalized illustration of a MUST transmitter with two superposed UEs.
Figure 2:
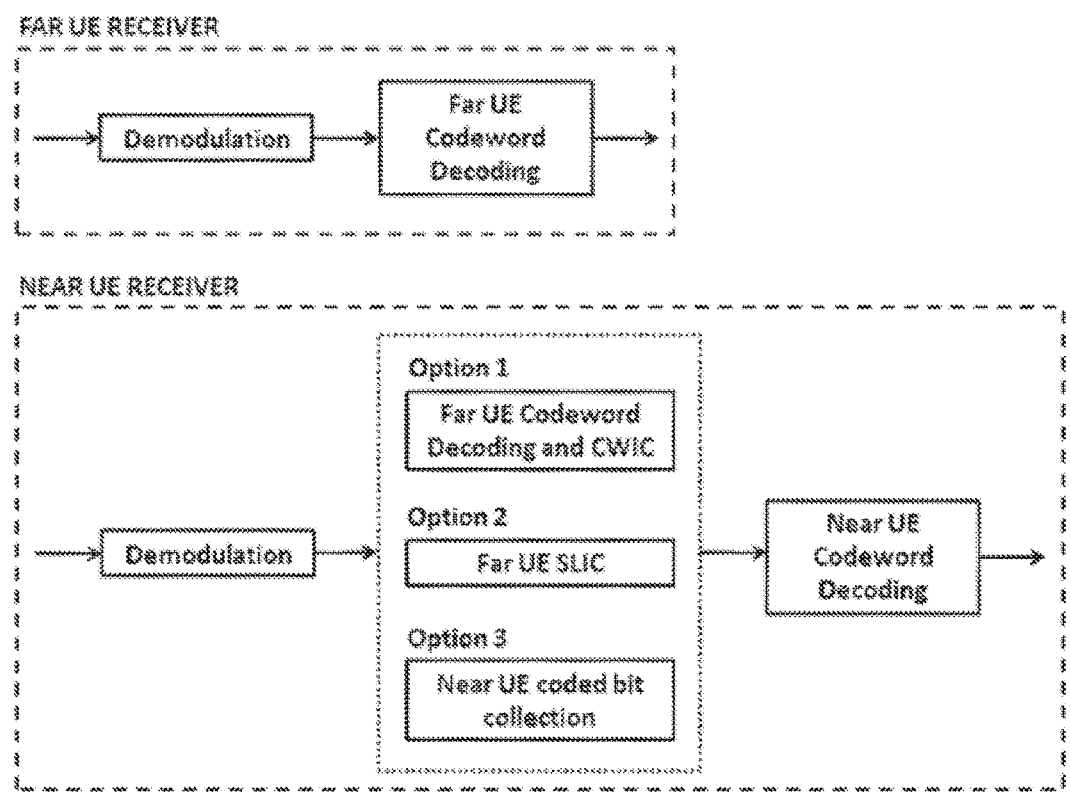
FIG. 2 is a generalized illustration of MUST receiver processing with two superposed information streams intended for two UEs respectively.
Figure 3:
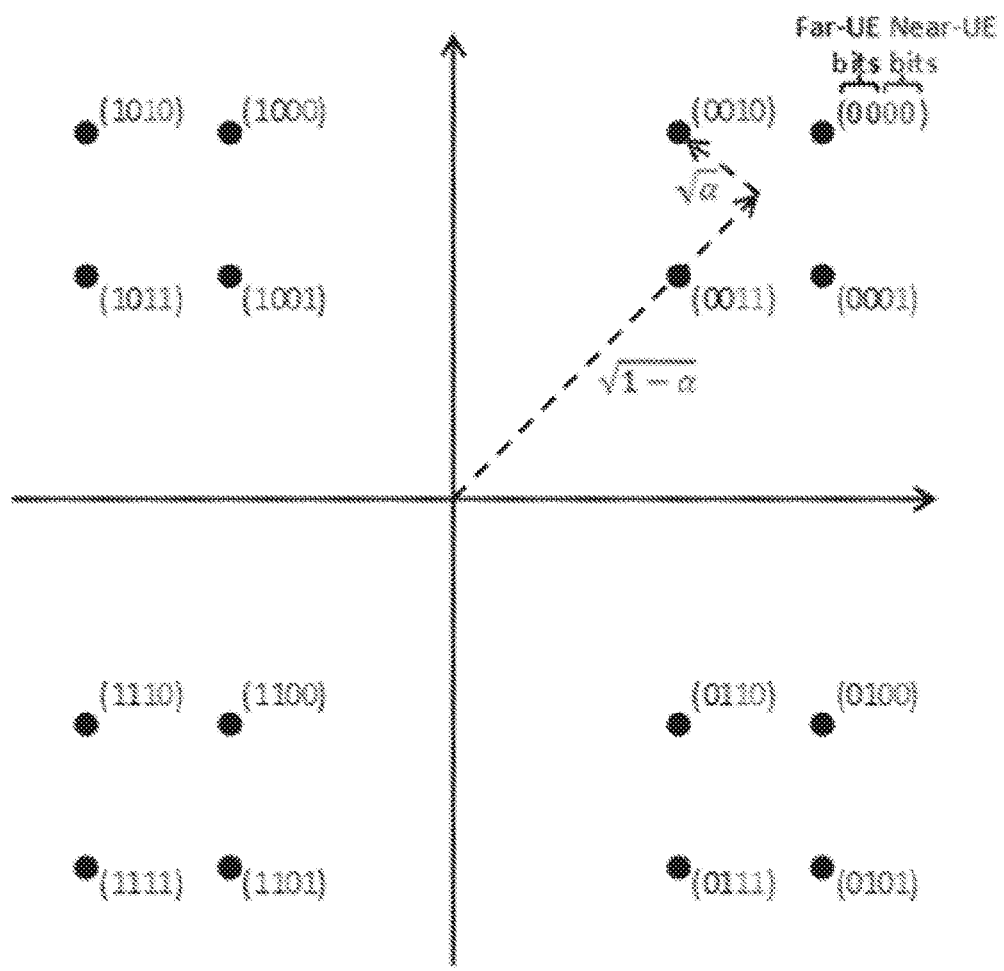
FIG. 3 illustrates an example of superposed NOMA constellation.
Figure 4:
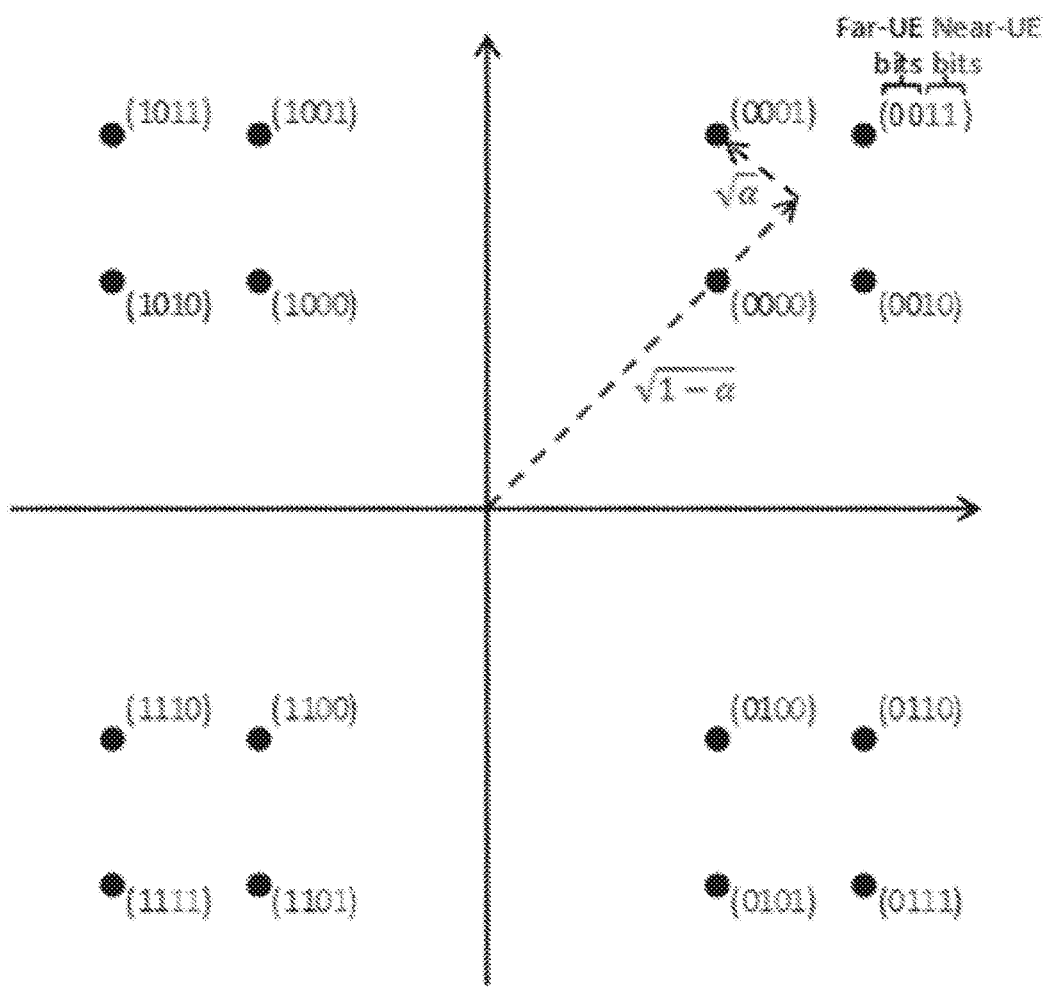
FIG. 4 illustrates another example of superposed SOMA constellation.
Figure 5:
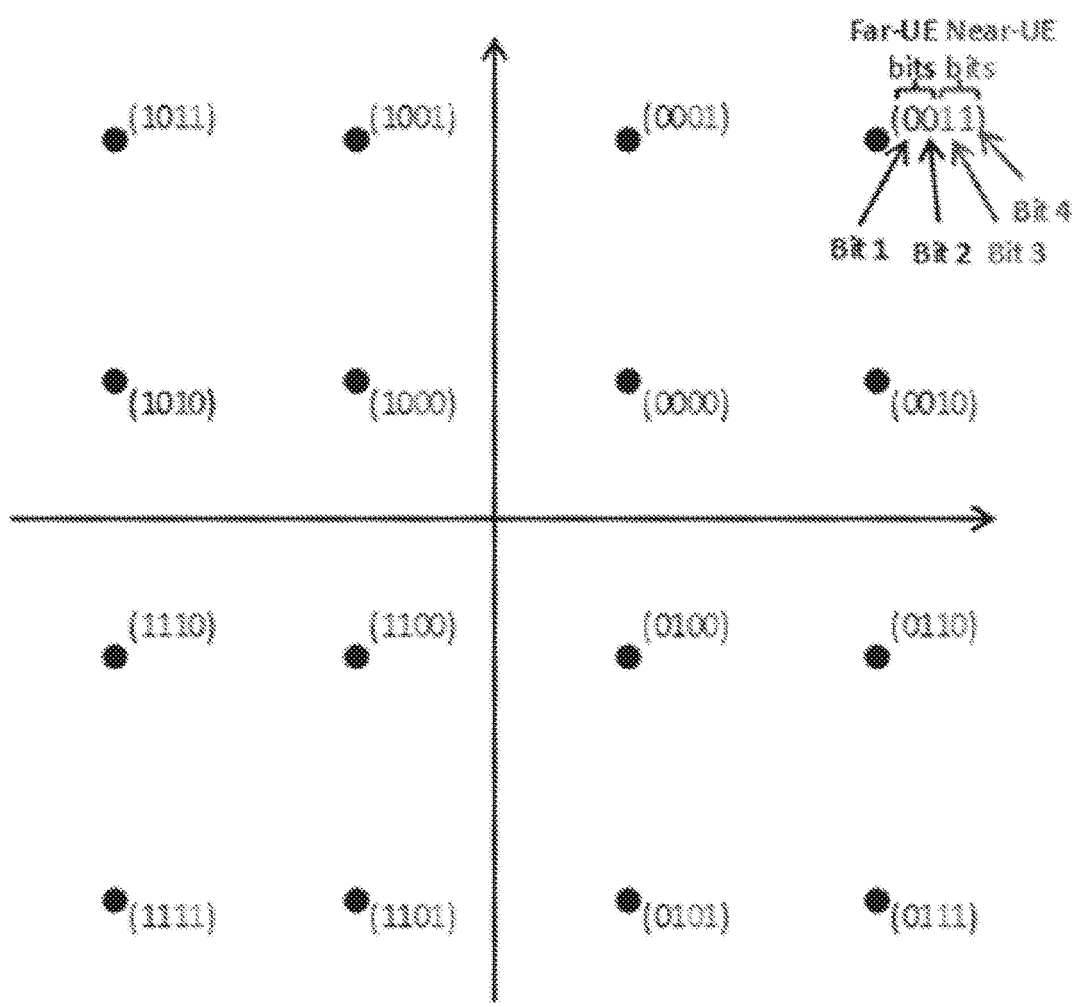
FIG. 5 illustrates an example of 16-QAM superposed REMA constellation.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present invention provide for allowing multiple CSI reports to be sent by the UE for the purpose of MUST. The multiple CSI reports may correspond to different data transmission power levels, different rank restrictions, or different precoders with the best and the second best measured quality CQI values.

For example, a radio access network node, such as an LTE eNodeB, or eNB, is configured to support the transmission of multi-user superposition transmissions, where multi-user superposition transmission comprises transmitting, in each of a plurality of time-frequency resource elements, a modulation symbol intended for a first UE and a modulation symbol intended for a second UE, using the same antennas and the same antenna precoding. The radio access network node receives multiple CSI reports from the first UE for a first reporting instance. One or more of the received multiple CSI reports correspond to different possible multi-user superposition transmission states, where a multi-user superposition transmission state is a particular combination of allocated transmission power and transmit antenna precoding. The different possible multi-user superposition transmission states may foe example be one or more respective multi-user superposition transmission states corresponding to the one or more of the received multiple CSI reports. The radio access network node is also configured to determine whether to use multi-user superposition transmission or orthogonal multiple access transmission for scheduling the first UE in a first scheduling interval, based on the received multiple CSI reports.

Multiple CSI reports of a reporting instance can be considered to be associated with one another, in that they generally correspond to the same interval of time and/or the same radio channel measurements. Reporting instances may be periodic, according to configuration instructions provided to the UE, but in some embodiments may also or instead be aperiodic, in response to a request from the radio access network node or another node.

Example methods of receiving multiple CSI reports include where the precoding matrix indicators, PMIs, of the multiple CSI reports from one UE that correspond to different data transmission power levels, different rank restrictions, or different qualities are compared to a PMI of another CSI report from another UE for the purpose of identifying valid MUST UE pairs.

In some cases, the first UE can be configured to send CSIs when the UE is configured to receive multi-user superposition transmissions. This can include, for example, providing a power ratio value selected from a first set of power ratio values, where the first set of power ratio values contains smaller power ratios than a second set of power ratio values, and where the second set of power ratio values may be used for UEs that are not configured to receive multi-user superposition transmissions, and where the power ratios are ratios of PDSCH energy to reference signal energy. In this case, Physical Downlink Shared Channel, PDSCH, can be extended to a reference signal energy per resource element, RS EPRE, ratio range in CSI reports.

In another example, the first UE can be configured to report multiple CSIs when the UE is configured to receive multi-user superposition transmissions, where multi-user superposition transmission comprises transmitting a modulation symbol intended for a second UE using the same precoding and on the same antennas as a modulation symbol intended for the UE. A plurality of parameters corresponding to different potential multi-user superposition transmission states can be provided, the plurality of parameters comprising a set of transmission powers, a set of transmission rank restrictions, and/or a set of precoder restrictions.

It is noted that for some cases one of the CSI reports is not specific to MUST, perhaps to support dynamic switching between MUST and non-MUST transmissions. In other cases, the UE may not receive an explicit configuration message specific to MUST. In such cases, the existing signaling, not specific to MUST, can be used to realize rank restricted multiple CSI reports.

Continuing with the example of configuring the UE, in some cases, superposition hypotheses may only include serving PDSCH parameters, where superposition is defined as using the same precoding. All of the parameters may indicate one or more potential states of a transmission intended for the UE. In other examples, the UE is configured to send the multiple CSI reports aperiodically when requested by the eNodeB. Each CSI report may correspond to different data transmission power levels.

Additional examples include methods where one of the CSI reports corresponds to full data transmission power level (this corresponds to OMA CQI, which is important for dynamic switching between OMA and MUST). The UE may assume ideal interference cancellation for the CSI reports corresponding to non-full data transmission power levels. Each CSI report may correspond to different rank restrictions or CSI measurements of different quality.

Methods may include indicating a configuration of multiple CSI reports to a UE for the purposes of MUST where each configuration indication may contain one or more of a power ratio parameter with extended range to support MUST (radio resource control, RRC, signaling), a list of power ratio parameters with extended range to support MUST (RRC signaling), and/or a bit string indicating the restricted set of precoders to be considered during CSI measurements and feedback.

In some embodiments, a signal corresponding to the interference from a first UE to a second UE is transmitted on the interference measurement resource of the second UE where the first UE is configured to receive multi-user superposition transmissions. The interference component is transmitted using the same precoding and on the same antennas as the modulation symbols intended for the first and second UEs.

Three embodiments will be described in more detail below, but in general, it should be understood that multi-user superposition is distinct from multi-user multiple-input and multiple-output, MIMO, as used in LTE in that for multi-user superposition transmissions, the same antenna patterns and precoding (or "same effective antenna") are used for the transmissions intended for the different UEs. Multi-user MIMO, on the other hand, relies on spatial multiplexing between the users, which is achieved by using different antennas and/or antenna precoding. To facilitate multi-user superposition transmissions, the CSI feedback should accurately predict the needed transmission parameters to obtain good downlink throughput given this same effective antenna behavior CSI feedback comprises at least channel quality information, CQI, indicating a modulation and coding rate that could be used for a PDSCH transmitted to the UE providing the feedback at a predetermined block error rate. A CSI report may also comprise additional feedback such as precoding matrix indications, rank indications, etc. Therefore, in some cases, a UE is configured to send multiple CSI reports for the purpose of multi-user superposition transmission. The CSI reports may comprise at least a channel quality indication.

In some instances, a plurality of parameters corresponding to different potential multi-user superposition transmission states are hypothesized in CSI feedback. In general, the amount of feedback overhead and UE computational complexity grows in proportion to the number of parameters and multi-user transmission states for which the UE provides CSI feedback. Therefore, it is generally desirable to provide a small number of parameters that provides as much performance gain as possible.

If N parameter settings are jointly and independently hypothesized for M users in a multi-user transmission, the number of parameter settings is on the order of $N^M$. One approach to avoiding this exponential growth of the number of parameter hypotheses is to provide parameters corresponding only to hypotheses of the PDSCH intended for the UE, rather than those for both the intended and interfering PDSCHs, and to have the UE assume that single user transmission is used. In this case, it is still possible to have accurate CSI feedback when an interfering PDSCH is transmitted, so long as it is transmitted in the same way (i.e., using the precoding, etc.) as the desired PDSCH. This allows dynamic switching between multi-user superposition and single-user transmission.

Because parameters or the presence of the interfering far UE transmission are not part of the hypotheses, the UE should calculate the CSI assuming that a superposed far UE PDSCH does not interfere with the received near UE PDSCH. Therefore, in some embodiments, when calculating the MUST specific CQIs, a UE that employs interference cancellation (i.e., a 'near' UE, $UE_1$) may assume that the interference component in Equation 6 can be completely cancelled.

Example Embodiment 1

A first embodiment will now be described in more detail. In this embodiment, an eNodeB generally configures the UE(s) to send multiple CSI reports where one of the CSI reports corresponds to the OMA mode and one or more other CSI reports correspond to the MUST mode. Having one CSI report for OMA and one or more CSI report(s) for MUST ensures that the proposed solution supports dynamic switching between OMA and MUST modes. That is, the scheduler in the proposed scheme can more accurately decide whether OMA or MUST should be employed in a given scheduling band depending on which scheme provides the highest PF rate. To reduce uplink feedback overhead, the eNodeB may configure only the near UE(s) to send multiple CSI reports for the purposes of MUST; the far UE(s) may be configured to send only a single OMA CSI report. The eNodeB may use Reference Signal Received Power, RSRP, reports and/or uplink pathloss measurements to distinguish between the near and far UEs.

The eNodeB configures the OMA CSI report such that full transmission power allocation is assumed when the UE measures CQI. In the CSI report(s) configured specifically for MUST, the eNodeB configures the UE(s) such that each of the MUST specific CQIs corresponds to a different power share value. The steps involved in this embodiment are summarized below. Although these steps are described using one near UE and one far UE, the solution proposed in this embodiment is applicable to a plurality of near and far UEs.

Step 1:
The eNodeB configures a near UE $UE_1$ to send Q>1 CSI reports. One of the reports contains a CQI denoted by $CQI_{UE1}^0$ that corresponds to the OMA CQI (i.e., assumes full transmission power). The remaining Q-1 CSI reports contain CQIs denoted by $CQI_{UE1}^1$, $CQI_{UE2}^2$, ..., $CQI_{UE1}^{Q-1}$ that respectively correspond to Q-1 different MUST power share values $\alpha_1, \alpha_2, \ldots, \alpha_{Q-1}$ (note that $\alpha_1, \alpha_2, \ldots, \alpha_{Q-1}$ are assumed to be in non-decreasing order here). Additionally, the eNodeB configures a far UE $UE_2$ to send a single OMA CSI report containing a CQI that is denoted by $CQI_{UE2}^0$.

Step 2:
$UE_1$ calculates the CSI reports (including the CQIs) according to the power share hypotheses, and then sends the Q CSI reports to the eNodeB. Similarly, $UE_2$ sends the OMA CSI report to the eNodeB. When calculating the MUST specific CSIs, $UE_1$ may assume that the interference component in Equation 6 can be completely cancelled.

Step 3:
For each scheduling band, the eNodeB scheduler first checks if $CQI_{UE1}^0$ is sufficiently higher than $CQI_{UE2}^0$. Additionally, the scheduler checks the combination of precoders among these UEs when deciding whether $UE_1$ and $UE_2$ can be valid MUST pairs. This is done by comparing the PMI corresponding to $CQI_{UE2}^0$ with the PMIs corresponding to $CQI_{UE1}^1$, $CQI_{UE1}^2$, ..., $CQI_{UE1}^{Q-1}$. If the PMI of $CQI_{UE2}^0$ matches or is sufficiently close to the PMI of $CQI_{UE1}^q$ where $1 \leq q \leq (Q-1)$, then $UE_1$ and $UE_2$ can be valid MUST pairs with near UE power share parameter close to $\alpha_q$.

Step 4:
If $UE_1$ and $UE_2$ are deemed a valid MUST pair, then the eNodeB scheduler can select a near UE power share parameter $\tilde{\alpha}$ close to $\alpha_q$. The parameter $\tilde{\alpha}$ is selected from a set A of predetermined power share parameter values (i.e., $\tilde{\alpha} \in A$).

Step 5:
For the selected C value, calculate the scheduling SINRs for MUST using $SINR_{UE_1}$ and $SINR_{UE_2}$, corresponding to CQI reports $CQI_{UE1}^q$ and $CQI_{UE2}^0$ with the following approximations:

$UE_1$'s scheduling SINR for MUST is calculated as $$\frac{\tilde{\alpha}}{\alpha_q} \times SINR_{UE1}^q \qquad \text{Equation 13}$$

$UE_2$'s scheduling SINR for MUST is calculated as $$\frac{1 - \tilde{\alpha}}{\tilde{\alpha} + \frac{1}{SINR_{UE2}^0}} \qquad \text{Equation 14}$$

Step 6:
The scheduler then calculates the MUST PF metric corresponding to the MUST UE pair under consideration as $$\sum_{UE_i \in U} \left( \frac{R(i|U, \tilde{\alpha}, \alpha_q)}{L(i)} \right) \qquad \text{Equation 15}$$

where $R(i|U, \tilde{\alpha}, \alpha_q)$ and $L(i)$ respectively denote the instantaneous throughput and the average throughput of $UE_i$. In Equation 15, $R(i|U, \tilde{\alpha}, \alpha_q)$ is a function of MUST scheduling SINRs computed in Equation 13-Equation 14, and hence $R(i|U, \tilde{\alpha}, \alpha_q)$ also depends on the power share parameters $\tilde{\alpha}$ and $\alpha_q$. The candidate user set U contains the MUST UE pair under consideration.

Step 7:
The steps 3-6 are repeated for all valid MUST UE pairs with all $\alpha_q$ that yield matching PMIs and all $\tilde{\alpha}$ values in the set A. Additionally, the OMA PF metrics corresponding to each UE belonging to the serving cell are also calculated using the reported OMA CQIs (i.e., $CQI_{UE1}^0$ and $CQI_{UE2}^0$) as is currently done in LTE.

Step 8:
From Step 7, the scheduler decides whether OMA or MUST should be employed in the current scheduling band depending on which scheme provides the highest PF rate. The UE(s) corresponding to the highest PF metric are scheduled. In case the MUST scheme is scheduled in the scheduling band, the power share parameter pair $(\tilde{\alpha}, \alpha_q)$ that yields the highest PF rate is chosen.

In one variant of this embodiment, the eNodeB, in Step 1, may configure a far UE $UE_2$ using LTE transmission mode 10 to send a single CSI report containing a CQI while at the same time transmitting the interference term $\sqrt{\alpha P}g_F(k)x_N(k)$ (see Equation 9) in $UE_2$'s interference measurement resource (IMR). The far UE $UE_2$ may not be aware of the superposed interference from $UE_1$ and may not be configured to receive multi-user superposition transmission. Since transmitting the interference term on the IMR improves a UE's interference estimate without requiring any a-priori knowledge of the interference characteristics, the CSI feedback from a far UE served by multi-user superposition transmission can be improved without any additional UE complexity. There may be further improvements for the CSI estimate of the far UE if the CSI report of $UE_2$ is configured with a MUST power share value of $(1-\alpha)$ as well. Note that since the power offset values used for CSI in LTE Rel-12 (for example, $P_c$ described in further detail below) may cover the range needed for the far UE served by MUST transmissions, the far UE may not need to be aware that its power share value of $(1-\alpha)$ is for the purpose of MUST transmission It should be noted that MUST specific CSI (i.e., $CQI_{UE1}^q$) is used in this solution for identifying valid MUST pairs (Step 3), calculating near UE's MUST scheduling SINR (Step 5), and computing the MUST PF metrics (Step 6). As a result, the problems of rank mismatch, CQI mismatch, and PMI mismatch are alleviated in this solution. In addition, the solution of Embodiment 1 also supports dynamic switching between OMA and MUST modes. That is, the scheduler in the proposed scheme can more accurately decide whether OMA or MUST should be employed in a given scheduling band depending on which scheme provides the highest PF rate.

The RRC signaling required to support the solution of Embodiment 1 in LTE transmission mode 10, TM10, can be realized in a few different ways. In current LTE, a parameter $P_c$ is signaled by the eNodeB to the UE to indicate the ratio of the PDSCH energy per resource element ('EPRE') to CSI-RS EPRE. In other words, the $P_c$ parameter indicates the ratio of the downlink data transmitted power per resource element to the channel state information reference symbol power per resource element. The UE uses the $P_c$ parameter to determine the reference data transmission power during CSI feedback. Currently, $P_c$ takes values in the range of [−8, 15] dB with 1 dB step size. However, to support the solution of Embodiment 1, the range of $P_c$ should be extended to cover the desired near UE power share $\alpha$ values in dB. For instance, the range of near UE power share values in Table 1 should be covered. So if the range of $P_c$ is extended to [−19, 15] dB then all the possible REMA cases in Table 1 should be covered. However, if extending the range of $P_c$ value to −19 dB is an overkill, then a more reasonable range extension for $P_c$ would be [−13, 15] dB which covers a majority of superposed REMA constellations in Table 1.

An example using RRC signaling of the CSI-Process information element with the range-extended $P_c$ parameter (which is denoted as p-C-r11) is shown in Table 2. With the CSI-Process information element of Table 2, an eNodeB can currently configure a UE to report 2 MUST specific CQIs and 1 OMA CQI (a total of Q=3 CSI reports). This is because in current LTE it is possible to configure a maximum of 3 CSI-RS processes per UE in TM10 (i.e., the maxCQI-ProcEt-r11 parameter can be currently set to 3, for example). However, if maxCQI-ProcExt-r11 is further increased, it is possible to have more than 2 MUST specific CQIs (i.e., Q>3).

Alternatively, if subframe patterns for CSI (CQI/PMI/PTI/RI) reporting are configured (i.e. csi-SubframePattern-Config is configured), then the UE can be configured to send two CSI reports per CSI process in the two CSI measurement subframe sets currently supported in LTE. In each CSI process, two different $P_c$ values can be set in the two CSI measurement subframe sets by having two entries in p-C-AndCBSRList-r11. This can be exploited to configure up to Q=6 CSI reports in LTE TM10 (i.e., 2 CSI reports per CSI process×3 CSI processes). Hence, by configuring subframe patterns for CSI reporting, it is possible for the eNodeB to configure a near UE to report up to 5 MUST specific CSIs and 1 OMA CSI.

Yet another alternative is to introduce a new sequence called p-C-List in the CSI-Process information element. This sequence will contain a configurable number (for instance, say Q) of entries of type $P_c$. In this alternative, the eNodeB will configure the UE to report Q CSI measurements from the same CSI process (thus, reducing the CSI-RS overhead from having to use multiple CSI processes). Each of the Q CST reports will correspond to one of $P_c$ values contained in p-C-List. Thus, with this alternative, Embodiment 1 can be realized in LTE TM10 with a flexibly configurable number Q of CSI reports.

TABLE 2

CSI-Process information element

```
-- ASN1START
CSI-Process-r11 ::=          SEQUENCE {
    csi-ProcessId-r11            CSI-ProcessId-r11,
    csi-RS-ConfigNZPId-r11       CSI-RS-ConfigNZPId-r11,
    csi-IM-ConfigId-r11          CSI-IM-ConfigId-r11,
    p-C-AndCBSRList-r11          SEQUENCE (SIZE (1..2)) OF P-C-AndCBSR-r11,
    cqi-ReportBothProc-r11       CQI-ReportBothProc-r11    OPTIONAL, -- Need OR
    cqi-ReportPeriodicProcId-r11         INTEGER (0..maxCQI-ProcExt-r11)   OPTIONAL,
-- Need OR
    cqi-ReportAperiodicProc-r11  CQI-ReportAperiodicProc-r11    OPTIONAL, -- Need OR
    ....
    [[ alternativeCodebookEnabledFor4TXProc-r12 ENUMERATED {true}
        OPTIONAL, -- Need ON
        csi-IM-ConfigIdList-r12          CHOICE {
            release                          NULL,
            setup                            SEQUENCE (SIZE (1..2)) OF CSI-IM-ConfigId-
r12
    }                                                OPTIONAL, -- Need ON
```

TABLE 2-continued

CSI-Process information element

```
            cqi-ReportAperiodicProc2-r12        CHOICE {
                release                             NULL,
                setup                               CQI-ReportAperiodicProc-r11
            }                                                   OPTIONAL -- Need ON
        ]]
    }
}
P-C-AndCBSR-r11 ::=                     SEQUENCE {
    p-C-r11                         INTEGER (-13..15),
    codebookSubsetRestriction-r11   BIT STRING
}
-- ASN1STOP
```

CSI-Process field descriptions are as follows.
alternativeCodebookEnabledFor4TXProc Indicates whether code book in TS 36.213 Table 7.2.4-0A to Table 7.2.4-0D is being used for deriving CSI feedback and reporting for a CSI process. EUTRAN may configure the field only if the number of CSI-RS ports for non-zero power transmission CSI-RS configuration is 4.
cqi-ReportAperiodicProc If csi-MeasSubframeSets-r12 is configured for the same frequency as the CSI process, cqi-ReportAperiodicProc applies for CSI subframe set 1. If csi-MeasSubframeSet1-r10 or csi-MeasSubframeSet2-r10 are configured for the same frequency as the CSI process, cqi-ReportAperiodicProc applies for CSI subframe set 1 or CSI subframe set 2. Otherwise, cqi-ReportAperiodicProc applies for all subframes
cqi-ReportAperiodicProc2 cqi-ReportAperiodicProc2 is configured only if csi-MeasSubframeSets-r12 is configured for the same frequency as the CSI process. cqi-ReportAperiodicProc2 is for CSI subframe set 2. E-UTRAN shall set cqi-ReportModeAperiodic-r11 in cqi-ReportAperiodicProc2 the same as in cqi-ReportAperiodicProc.
cqi-ReportBothProc Includes CQI configuration parameters applicable for both aperiodic and periodic CSI reporting, for which CSI process specific values may be configured. E-UTRAN configures the field if and only if cqi-ReportPeriodicProcId is included and/or if cqi-ReportAperiodicProc is included.
cqi-ReportPeriodicProcId Refers to a periodic CQI reporting configuration that is configured for the same frequency as the CSI process. Value 0 refers to the set of parameters defined by the REL-10 CQI reporting configuration fields, while the other values refer to the additional configurations E-UTRAN assigns by CQI-ReportPeriodicProcExt-r11 (and as covered by CQI-ReportPeriodicProcExtId).
csi-IM-ConfigId Refers to a CSI-IM configuration that is configured for the same frequency as the CSI process.
csi-IM-ConfigIdList Refers to one or two CSI-IM configurations that are configured for the same frequency as the CSI process. csi-M-ConfigIdList can include 2 entries only if csi-MeasSubframeSets-r12 is configured for the same frequency as the CSI process. UE shall ignore csi-IM-ConfigId-r11 if csi-IM-ConfigIdList-r12 is configured.
csi-RS-ConfigNZPId Refers to a CSI RS configuration using non-zero power transmission that is configured for the same frequency as the CSI process.

p-C

Parameter: $P_c$, see TS 36.213.
p-C-AndCBSRList

A p-C-AndCBSRList including 2 entries indicates that the subframe patterns configured for CSI (CQI/PMI/PTI/RI) reporting (i.e. as defined by field csi-MeasSubframeSet1 and csi-MeasSubframeSet2, or as defined by csi-MeasSubframeSets-r12) are to be used for this CSI process, while a single entry indicates that the subframe patterns are not to be used for this CSI process. E-UTRAN does not include 2 entries in p-C-AndCBSRList with csi-MeasSubframeSet1 and csi-MeasSubframeSet2 for CSI processes concerning a secondary frequency. E-UTRAN includes 2 entries in p-C-AndCBSRList when configuring both cqi-pmi-ConfigIndex and cqi-pmi-ConfigIndex2.

The RRC signaling required to support the solution of Embodiment 1 in LTE transmission mode 9, TM9, can be realized in a few different ways. An example RRC signaling of the CSI-RS-Config information element is shown in Table. Here, a new optional integer p-C2 is introduced in the CSI-RS-Config information element with range [−13, 15] dB which covers a majority of the superposed REMA constellations in Table 1. If subframe patterns for CSI (CQI/PMI/PTI/RI) reporting are configured (i.e. csi-SubframePatternConfig is configured), then the existing integer p-C-r10 is only used in the first CSI-MeasSubframeSet (i.e., CSI-MeasSubframeSet1) and the newly introduced integer p-C2 is only used in the second CSI-MeasSubframeSet (i.e., CSI-MeasSubframeSet2). This way the eNodeB can configure a near UE in TM9 to send one OMA CSI report on the first CSI-MeasSubframeSet and one MUST CSI report on the second CSI-MeaSubframeSet. Note that the parameter p-C2 is only signaled if the eNodeB wants to enable multiple CSI reports for the purposes of MUST. Hence, with this RRC signaling approach, the solution of Embodiment 1 can be supported in LTE TM9 with Q=2.

An alternative RRC signaling approach is to introduce a new sequence called p-C-List in the CSI-RS-Config information element. This sequence will contain a configurable number (for instance, say Q) of entries of type $P_c$. The range of values for $P_c$ will be extended to cover the MUST near UE power share values of interest (for instance, this range can be set to [−13, 15] dB as discussed above). In this alternative, the eNodeB will configure the UE to report Q CSI measurements per CSI-RS-Config. Each of the Q CSI reports will correspond to one of P values contained in p-C-List. Thus, with this alternative, Embodiment 1 can be realized in LTE TM9 with a flexibly configurable number Q of CSI reports.

TABLE 3

| CSI-RS-Config information element |
|---|

```
-- ASN1START
CSI-RS-Config-r10 ::=       SEQUENCE {
  csi-RS-r10                CHOICE {
    release                   NULL,
    setup                     SEQUENCE {
      antennaPortsCount-r10     ENUMERATED {an1, an2, an4, an8},
      resourceConfig-r10        INTEGER (0..31),
      subframeConfig-r10        INTEGER (0..154),
      p-C-r10                   INTEGER (-8..15),
      p-C2                      INTEGER (-13..15)
    }
  }                                                     OPTIONAL, -- Need ON
  zeroTxPowerCSI-RS-r10     ZeroTxPowerCSI-RS-Conf-r12    OPTIONAL -- Need
ON
}
CSI-RS-Config-v1250 ::=     SEQUENCE {
  zeroTxPowerCSI-RS2-r12        ZeroTxPowerCSI-RS-Conf-r12    OPTIONAL,
  -- Need ON
  ds-ZeroTxPowerCSI-RS-r12      CHOICE {
    release                       NULL,
    setup                         SEQUENCE {
      zeroTxPowerCSI-RS-List-r12    SEQUENCE (SIZE (1..maxDS-ZTP-CSI-
RS-r12)) OF ZeroTxPowerCSI-RS-r12
    }
  }                                                     OPTIONAL -- Need ON
}
ZeroTxPowerCSI-RS-Conf-r12 ::=   CHOICE {
  release                          NULL,
  setup                            ZeroTxPowerCSI-RS-r12
}
ZeroTxPowerCSI-RS-r12::=   SEQUENCE {
  zeroTxPowerResourceConfigList-r12    BIT STRING (SIZE (16)),
  zeroTxPowerSubframeConfig-r12        INTEGER (0..154)
}
-- ASN1STOP
```

CSI-RS-Config field descriptions will be provided.
ds-ZeroTxPowerCSI-RS
  Parameter for additional zeroTxPowerCSI-RS for a serving cell, concerning the CSI-RS included in discovery signals.
zeroTxPowerCSI-RS2
  Parameter for additional zeroTxPowerCSI-RS for a serving cell. E-UTRAN configures the field only if csi-MeasSubframeSets-r12 and TM 1-9 are configured for the serving cell.
p-C
  Parameter: $P_c$, see TS 36.213 (See Section 7.2.5).
p-C2
  Additional $P_c$ parameter (see Section 7.2.5) only signalled when subframe patterns for CSI (CQI/PMI/PTI/RI) reporting are configured and when multiple CQI reports for the purposes of MUST are desired. If signalled, p-C is only used in the first (CSI-MeasSubframeSet (i.e., CSI-MeasSubframeSet1) and p-C2 is only used in the second CSI-MeasSubframeSet (i.e., CSI-MeasSubframeSet2).
resourceConfig
  Parameter: CSI reference signal configuration, see TS 36.211 (See Tables 6.10.5.2-1 and 6.10.5.2-2)
subframeConfig
  Parameter: $I_{CSI-RS}$, see TS 36.211 (See Tables 6.10.5.3-1).
zeroTxPowerResourceConfigList
  Parameter: ZeroPowerCSI-RS, see TS 36.213 (See Section 7.2.7).
zeroTxPowerSubframeConfig
  Parameter: $I_{CSI-RS}$, see TS 36.211 (See Table 6.10.5.3-1).
  The RRC signaling required to support the solution of Embodiment 1 in LTE transmission mode 4, TM4, can be realized in a few different ways. In current LTE, a parameter $P_A$ is signaled by the eNodeB to the UE which is used to define the ratio of the PDSCH EPRE to cell specific RS ('CRS') EPRE. In TM4, the UE uses the $P_A$ parameter to determine the reference data transmission power during CSI feedback. Currently, $P_A$ can take on values of {-6 dB, -4.77 dB, -3 dB, -1.77 dB, 0 dB, 1 dB, 2 dB, 3 dB}. However, to support the solution of Embodiment 1, the range of $P_A$ should be extended to cover the desired near UE power share $\alpha$ values in dB. For instance, the range of near UE power share values in Table 1 should be covered. So if additional values of -19.21 dB, -13.19 dB, -12.29 dB, and -6.9867 dB can be added to the list of possible $P_A$ values then all the possible REMA cases in Table 1 should be covered. If this is overkill, a subset of these additional values can be added to the list of possible $P_A$ values so that most of the superposed REMA constellations in Table 1 can be supported.
  One alternative is to define a new information element, IE, called MUST-AssistanceInfo as shown in Table 4. This new IE will be part of the dedicated RRC signaling. The IE contains a sequence servCellp-aList of size maxP-a-PerServCell-r13 (containing $P_A$ values) to be signaled when multiple CSI reports for the purposes of MUST are desired. In this alternative, the eNodeB will configure the UE to report Q CSI measurements where Q is equal to maxP-a-PerServCell-r13. Each of the Q CQIs in the CSI reports will correspond to one of Pa values contained in servCellp-aList. Thus, with this alternative, Embodiment 1 can be realized in LTE TM4 with a flexibly configurable number Q of CSI reports.
  In another alternative, the size of servCellp-aList in Table 4 can be set to 2 If subframe patterns for CSI (CQI/PMI/PTI/RI) reporting are configured (i.e., csi-SubframePatternConfig is configured), then the first $P_A$ value in servCellp-aList is only used in the first CSI-MeasSubframeSet (i.e., CSI-MeasSubframeSet1) and the second $P_A$ value in servCellp-aList is only used in the second CSI-MeasSubframeSet (i.e., CSI-MeasSubframeSet2). This way the eNodeB can configure a near UE in TM4 to send one OMA CSI report on the first CSI-MeasSubframeSet and one MUST CSI report on the second CSI-MeasSubframeSet. Hence, with this RRC signaling approach, the solution of Embodiment 1 can be supported in LTE TM4 with Q=2.

TABLE 4

MUST-AssistanceInfo information element

MUST-AssistanceInfo-r13 ::=        CHOICE {
  release              NULL,
  setup                SEQUENCE {
  servCellp-aList-r13 SEQUENCE (SIZE (1..maxP-a-PerServCell-r13)) OF P-a
OPTIONAL -- Need ON
  }
}
P-a ::- ENUMERATED { dB-13dot19, dB-6, dB-4dot77, dB-3, dB-1dot77,
                                  dB0, dB1, dB2, dB3}

MUST-AssitanceInfo field descriptions are defined as the following.

P-a
Parameter: $P_A$, see TS 36.213 (see Section 5.2). Value dB-6 corresponds to −6 dB, dB-4dot77 corresponds to −4.77 dB etc.

servCellp-aList
Indicates the list of $P_A$ parameters to be only signalled when multiple CSI reports for the purposes of MUST are desired.

Embodiment 2

In this embodiment, the eNodeB generally configures the UE(s) to send multiple CSIs for the purposes of MUST wherein each of several CQIs among the CSI reports corresponds to different rank restrictions. If the eNodeB is equipped with $N_{Tx}$ transmit antennas and each UE has $N_{Rx}$ receive antennas, then the maximum transmission rank possible is given by $$R_{max} = \min(N_{Tx}, N_{Rx}). \quad \text{Equation 16}$$

Hence, in this embodiment, the eNodeB may configure the UE to report $R_{max}$ CQIs. For instance, when $R_{max}=2$, the UE will report 2 CQIs where the first CQI will be restricted to rank 1 and the second CQI will be restricted to rank 2. The UE will assume full data transmission power is allocated to the UE when calculating CSI feedback. Furthermore, the eNodeB can easily determine the OMA CSI by choosing the CSI report with the CQI that provides the best instantaneous throughput among the $R_{max}$ CSI reports. To reduce uplink feedback overhead, the eNodeB may configure only the near UE(s) to send multiple CQI reports for the purposes of MUST, the far UE(s) may be configured to send only a single OMA CSI report. The eNodeB may use RSRP reports and/or uplink pathloss measurements to distinguish between the near and far UEs. The steps involved in this embodiment are summarized below. Although these steps are described using one near UE and one far UE, the solution proposed in this embodiment is applicable to a plurality of near and far UEs.

Step 1:
The eNodeB configures a near UE $UE_1$ to send $R_{max}>1$ CSI reports. The $r^{th}$ CSI report with $CQI_{UE1}^r$ of $UE_1$ is restricted to rank r where $1 \le r \le R_{max}$. Additionally, the eNodeB configures a far UE $UE_2$ to send a single OMA CSI report that contains a CQI denoted by $CQI_{UE2}$.

Step 2:
$UE_1$ sends the $R_{max}$ CSI reports to the eNodeB. Similarly, $UE_2$ sends the OMA CSI report to the eNodeB. When measuring the $R_{max}$ CSIs, $UE_1$ will assume full data transmission power is allocated to itself.

Step 3:
For each scheduling band, the eNodeB scheduler first determines the OMA CSI (containing a CQI denoted by $CQI_{UE1}$) corresponding to $UE_1$. This is done by choosing the CQI from the CSI reports that provides the best instantaneous throughput among $CQI_{UE1}^1$, $CQI_{UE1}^2$, ..., $CQI_{UE1}^{R_{max}}$.

Step 4:
For each scheduling band, the eNodeB scheduler checks if $CQI_{UE1}$ is sufficiently higher than $CQI_{UE2}$. Additionally, the scheduler checks the combination of precoders among these UEs when deciding whether $UE_1$ and $UE_2$ can be valid MUST pairs. This is done by comparing the PMI corresponding to $CQI_{UE2}$ with the PMIs corresponding to $CQI_{UE1}^1$, $CQI_{UE1}^2$, ..., $CQI_{UE1}^{R_{max}}$. If the PMI of $CQI_{UE2}$ matches the PMI of $CQI_{UE1}^r$ where $1 \le r \le R_{max}$, then $UE_1$ and $UE_2$ can be valid MUST pairs.

Step 5:
If $UE_1$ and $UE_2$ are deemed a valid MUST pair, then the eNodeB scheduler can select a near UE power share parameter $\tilde{\alpha}$. The parameter $\tilde{\alpha}$ is selected from a set A of predetermined power share parameter values (i.e., $\tilde{\alpha} \in A$).

Step 6:
For the selected C value, calculate the scheduling SINRs for MUST using $SINR_{UE_1}$ and $SINR_{UE_2}$, corresponding to CQI reports $CQI_{UE1}^r$ and $CQI_{UE2}$ with the following approximations:

$UE_1$'s scheduling SINR for MUST is calculated as $$\tilde{\alpha} \times SINR_{UE1}^r \quad \text{Equation 17}$$

$UE_2$'s scheduling SINR for MUST is calculated as $$\frac{1-\tilde{\alpha}}{\tilde{\alpha} + \frac{1}{SINR_{UE2}}} \quad \text{Equation 18}$$

Step 7:
The scheduler then calculates the MUST PF metric corresponding to the MUST UE pair under consideration as $$\sum_{UE_i \in U} \left( \frac{R(i \mid U, \tilde{\alpha})}{L(i)} \right) \quad \text{Equation 19}$$

where $R(i|U, \tilde{\alpha})$ and $L(i)$ respectively denote the instantaneous throughput and the average throughput of $UE_i$. In Equation 19, $R(i|U, \tilde{\alpha})$ is a function of MUST scheduling SINRs computed in Equation 17-Equation 18, and hence $R(i|U, \tilde{\alpha})$ also depends on the power share parameters $\tilde{\alpha}$. The candidate user set U contains the MUST UE pair under consideration.

Step 8:

The steps 3-7 are repeated for all valid MUST UE pairs with all rank (i.e., all r) values that yield matching PMIs and all $\tilde{\alpha}$ values in the set A. Additionally, the OMA PF metrics corresponding to each UE belonging to the serving cell are also calculated using the reported OMA CQIs (i.e., $CQI_{UE1}$ and $CQI_{UE2}$) as is currently done in LTE.

Step 9:

From Step 8, the scheduler decides whether OMA or MUST should be employed in the current scheduling band depending on which scheme provides the highest PF rate. The UE(s) corresponding to the highest PF metric are scheduled. In case the MUST scheme is scheduled in the scheduling band, the power share parameter $\tilde{\alpha}$ and the rank value r that yield the highest PF rate are chosen.

It should be noted that since the best CQI corresponding to all possible ranks (i.e., all r) are taken into account in this embodiment, the problems of rank mismatch, CQI mismatch, and PMI mismatch are alleviated. In addition, the solution of Embodiment 2 also supports dynamic switching between OMA and MUST modes. That is, the scheduler in the proposed scheme can more accurately decide whether OMA or MUST should be employed in a given scheduling band depending on which scheme provides the highest PF rate. If very high ranks are unlikely due to the channel conditions, this embodiment can also be used with a rank $R<R_{max}$.

The RRC signaling required to support the solution of Embodiment 2 in LTE TM10 can be realized in a few different ways. In current LTE, a parameter codebookSubsetRestriction is signaled by the eNodeB to the UE to indicate the restricted set of precoders to be considered during CSI measurements/feedback. The eNodeB could use this parameter to implement different rank restrictions of Embodiment 2 on different CSI reports.

The existing RRC signaling of the CSI-Process information element is shown in Table 5. With the CSI-Process information element of Table 5, an eNodeB can currently configure a UE to send up to $R_{max}=3$ CSI reports each with different rank restrictions. This is because in current LTE it is possible to configure a maximum of 3 CSI-RS processes per UE in TM10 (i.e., the maxCQI-ProcExt-r11 parameter can currently be set to 3, for example). However, if maxCQI-ProcExt-r11 is further increased, it is possible to have more than 3 rank restricted CSI reports (i.e., $R_{max}>3$).

Alternatively, if subframe patterns for CSI (CQI/PMI/PTI/RI) reporting are configured (i.e. csi-SubframePatternConfig is configured), then the UE can be configured to send two CSI reports per CSI process in the two CSI measurement subframe sets currently supported in LTE. (Note that PTI stands for precoding type indicator.) In each CSI process, two different rank restrictions can be set in the two CSI measurement subframe sets by having two entries in p-C-AndCBSRList-r11 with appropriate codebookSubsetRestriction bit strings. This can be exploited to configure up to $R_{max}=6$ CSI reports in LTE TM10 (i.e., 2 CQI reports per CSI process×3 CSI processes). Hence, by configuring subframe patterns for CSI reporting, it is possible for the eNodeB to configure a near UE to send up to 6 rank restricted CSI reports.

Yet another alternative is to introduce a new sequence called CBSR-List in the CSI-Process information element. This sequence will contain a configurable number (for instance, say $R_{max}$) of entries of type codebookSubsetRestriction. In this alternative, the eNodeB will configure the UE to report $R_{max}$ CSI measurements from the same CSI process (thus, reducing the CSI-RS overhead from having to use multiple CSI processes). Each of the $R_{max}$ CSI reports will correspond to a different rank restriction indicated by one of the codebookSubsetRestriction bit strings contained in CBSR-List. Thus, with this alternative, Embodiment 2 can be realized in LTE TM10 with a flexibly configurable number $R_{max}$ of CSI reports.

TABLE 5

CSI-Process information elements

```
-- ASN1START
CSI-Process-r11 ::=        SEQUENCE {
  csi-ProcessId-r11          CSI-ProcessId-r11,
  csi-RS-ConfigNZPId-r11     CSI-RS-ConfigNZPId-r11,
  csi-IM-ConfigId-r11        CSI-IM-ConfigId-r11,
  p-C-AndCBSRList-r11        SEQUENCE (SIZE (1..2)) OF P-C-AndCBSR-r11,
  cqi-ReportBothProc-r11        CQI-ReportBothProc-r11       OPTIONAL, --
Need OR
  cqi-ReportPeriodicProcId-r11       INTEGER (0..maxCQI-ProcExt-r11)
  OPTIONAL,   -- Need OR
  cqi-ReportAperiodicProc-r11  CQI-ReportAperiodicProc-r11           OPTIONAL, --
Need OR
  ...,
  [[  alternativeCodebookEnabledFor4TXProc-r12 ENUMERATED {true}
OPTIONAL, -- Need ON
     csi-IM-ConfigIdList-r12            CHOICE {
        release                            NULL,
        setup                              SEQUENCE (SIZE (1..2)) OF CSI-IM-ConfigId-
r12
     }                                         OPTIONAL, -- Need
ON
     cqi-ReportAperiodicProc2-r12       CHOICE {
        release                            NULL
        setup                              CQI-ReportAperiodicProc-r11
     }                                         OPTIONAL -- Need
ON
]]
```

TABLE 5-continued

CSI-Process information elements

```
}
P-C-AndCBSR-r11 ::=        SEQUENCE {
  p-C-r11                    INTEGER (-8..15),
  codebookSubsetRestriction-r11    BIT STRING
}
-- ASN1STOP
```

CSI-Process field descriptions are described above.

The RRC signaling required to support the solution of Embodiment 2 in LTE TM4 and TM9 can be realized in a few different ways. One alternative is to define a new IE called MUST-AssistanceInfo as shown in Table 6. This new IE will be part of the dedicated RRC signaling. The IE contains a sequence CBSRList of size maxCBSR-r13 (containing codebookSubsetRestriction values) to be signaled when multiple CSI reports for the purposes of MUST are desired. In this alternative, the eNodeB will configure the UE to report $R_{max}$ CSI measurements where $R_{max}$ is equal to maxCBSR-r13. Each of the $R_{max}$ CSI reports will correspond to a different rank restriction indicated by one of the codebookSubsetRestriction bit strings contained in CBSRList. Thus, with this alternative, Embodiment 2 can be realized in LTE TM4 and TM9 with a flexibly configurable number $R_{max}$ of CSI reports.

In another alternative, the size of CBSRList in Table 6 can be set to 2. If subframe patterns for CSI (CQI/PMI/PTI/RI) reporting are configured (i.e. csi-SubframePatternConfig is configured), then the rank restriction indicated by the first codebookSubsetRestriction bit string in CBSRList is only used in the first CSI-MeasSubframeSet (i.e., CSI-MeasSubframeSet1) and the rank restriction indicated by the second codebookSubsetRestriction bit string in CBSRList is only used in the second CSI-MeasSubframeSet (i.e., CSI-MeasSubframeSet2). This way the eNodeB can configure a near UE in TM4 or TM9 to report one rank-1 CQI on the first CSI-MeasSubframeSet and one rank-2 CQI on the second CSI-MeasSubframeSet. Hence, with this RRC signaling approach, the solution of Embodiment 2 can be supported in LTE TM4 and TM9 with $R_{max}=2$.

TABLE 6

MUST-AssistanceInfo information element

```
MUST-AssistanceInfo-r13 ::=    CHOICE {
  release          NULL,
  setup            SEQUENCE {
  CBSRList-r13 SEQUENCE (SIZE(1..maxCBSR-r13)) OF codebookSubsetRestriction
OPTIONAL -- Need ON
  }
}
codebookSubsetRestriction     BIT STRING       OPTIONAL
```

MUST-AssistanceInfo field descriptions are described as follows.
codebookSubsetRestriction
    Parameter: codebookSubsetRestriction, see TS 36.213 (see Section 7.2) and TS 36.211 (see Section 6.3.4.2.3). The number of bits in the codebookSubsetRestriction for applicable transmission modes is defined in TS 36.213 (see Table 7.2-1b). If the UE is configured with transmission lode tm8, E-UTRAN configures the field codebookSubsetRestriction if PMI/RI reporting is configured. If the UE is configured with transmissionMode tm9, E-UTRAN configures the field codebookSubsetRestriction if PMI/RI reporting is configured and if the number of CSI-RS ports is greater than 1. E-UTRAN does not configure the field codebookSubsetRestriction in other cases where the UE is configured with transmissionMode tm8 or tm9.
servCellp-aList
    Indicates the list of codebookSubsetRestriction parameters to be only signalled when multiple CSI reports for the purposes of MUST are desired.

In some cases, it may be desirable to configure the UE so that it provides a mixed-rank CSI in addition to one or more rank-restricted CSIs, particularly when the maximum supportable rank is high. For instance, if there are there three CST processes and up to four ranks, then the UE might be configured, using the above techniques, to report a rank-1 CSI for the first CSI process, a rank-2 CSI for the second CSI process, and a joint rank3-rank4 restriction on the third process (meaning that the third CSI process can consider both rank-3 and rank-4). This way embodiment 2 can be supported for higher rank cases without increasing the number of CSI processes.

Embodiment 3

In this embodiment, the eNodeB configures the UE(s) to send Z>1 CSI reports for the purposes of MUST wherein the $z^{th}$ CSI report contains the $z^{th}$ best CQI (the corresponding PMI and RI are also included in the report). The UE will assume full data transmission power is allocated to the UE during CSI measurement corresponding to all CSI reports. To reduce uplink feedback overhead, the eNodeB may configure only the near UE(s) to send multiple CSI reports for the purposes of MUST; the far UE(s) may be configured to send only a single OMA CSI report. The eNodeB may use RSRP reports and/or uplink pathloss measurements to distinguish between the near and far UEs The steps involved in this embodiment are summarized below. Although these steps are described using one near UE and one far UE, the solution proposed in this embodiment is applicable to a plurality of near and far UEs.

Step 1:

The eNodeB configures a near UE $UE_1$ to send Z>1 CSI reports. One of the CQIs in the reports denoted by $CQI_{UE1}^0$ corresponds to the OMA CQI (i.e., the best CQI). The remaining Z−1 CQIs in the reports are denoted by $CQI_{UE1}^1$, $CQI_{UE1}^2$, ..., $CQI_{UE1}^{Z-1}$, where the $z^{th}$ CSI report with $CQI_{UE1}^z$ contains the $z^{th}$ best CQI. Additionally, the eNodeB configures a far UE $UE_2$ to report a single OMA CSI report that contains a CQI that is denoted by $CQI_{UE2}^0$.

Step 2:

$UE_1$ sends the Z CSI reports to the eNodeB. Similarly, $UE_2$ sends the OMA CSI report to the eNodeB. When measuring the Z CSIs, $UE_1$ will assume full data transmission power is allocated to itself.

Step 3:

For each scheduling band, the eNodeB scheduler first checks if $CQI_{UE1}^0$ is sufficiently higher than $CQI_{UE2}^0$. Additionally, the scheduler checks the combination of precoders among these UEs when deciding whether $UE_1$ and $UE_2$ can be valid MUST pairs. This is done by comparing the PMI corresponding to $CQI_{UE2}^0$ with the PMIs corresponding to $CQI_{UE1}^0$, $CQI_{UE1}^2$, ..., $CQI_{UE1}^{Z-1}$. If the PMI of $CQI_{UE2}^0$ matches the PMI of $CQI_{UE1}^z$ where 0≤z≤(Z−1), then $UE_1$ and $UE_2$ can be valid MUST pairs.

Step 4:

If $UE_1$ and $UE_2$ are deemed a valid MUST pair, then the eNodeB scheduler can select a near UE power share parameter $\tilde{\alpha}$. The parameter $\tilde{\alpha}$ is selected from a set A of predetermined power share parameter values (i.e., $\tilde{\alpha} \in A$).

Step 5:

For the selected $\tilde{\alpha}$ value, calculate the scheduling SINRs for MUST using $SINR_{UE_1}$ and $SINR_{UE_2}$, corresponding to CQI reports $CQI_{UE1}^z$ and $CQI_{UE2}^0$ with the following approximations:

$UE_1$'s scheduling SINR for MUST is calculated as $$\tilde{\alpha} \times SINR_{UE1}^z \quad \text{Equation 20}$$

$UE_2$'s scheduling SINR for MUST is calculated as $$\frac{1-\tilde{\alpha}}{\tilde{\alpha} + \frac{1}{SINR_{UE2}^0}} \quad \text{Equation 21}$$

Step 6:

The scheduler then calculates the MUST PF metric corresponding to the MUST UE pair under consideration as $$\sum_{UE_i \in U} \left( \frac{R(i|U, \tilde{\alpha})}{L(i)} \right) \quad \text{Equation 22}$$

where $R(i|U, \tilde{\alpha})$ and $L(i)$ respectively denote the instantaneous throughput and the average throughput of $UE_i$. In Equation 22, $R(i|U, \tilde{\alpha})$ is a function of MUST scheduling SINRs computed in Equation 20-Equation 21, and hence $R(i|U, \tilde{\alpha})$ also depends on the power share parameter $\tilde{\alpha}$. The candidate user set U contains the MUST UE pair under consideration.

Step 7:

The steps 3-6 are repeated for all valid MUST UE pairs with all possible z values that yield matching PMIs and all $\tilde{\alpha}$ values in the set A. Additionally, the OMA PF metrics corresponding to each UE belonging to the serving cell are also calculated using the reported OMA CQIs (i.e., $CQI_{UE1}^0$ and $CQI_{UE2}^0$) as is currently done in LTE.

Step 8:

From Step 7, the scheduler decides whether OMA or MUST should be employed in the current scheduling band depending on which scheme provides the highest PF rate. The UE(s) corresponding to the highest PF metric are scheduled. In case the MUST scheme is scheduled in the scheduling band, the power share parameter $\tilde{\alpha}$ and the z value that yield the highest PF rate are chosen.

It should be noted that since Z best CQIs corresponding to the near UE are taken into account in this embodiment, the problems of rank mismatch, CQI mismatch, and PMI mismatch are alleviated. In addition, the solution of Embodiment 3 also supports dynamic switching between OMA and MUST modes. That is, the scheduler in the proposed scheme can more accurately decide whether OMA or MUST should be employed in a given scheduling band depending on which scheme provides the highest PF rate.

Aperiodic CSI Feedback for MUST Transmission

Figure 6:
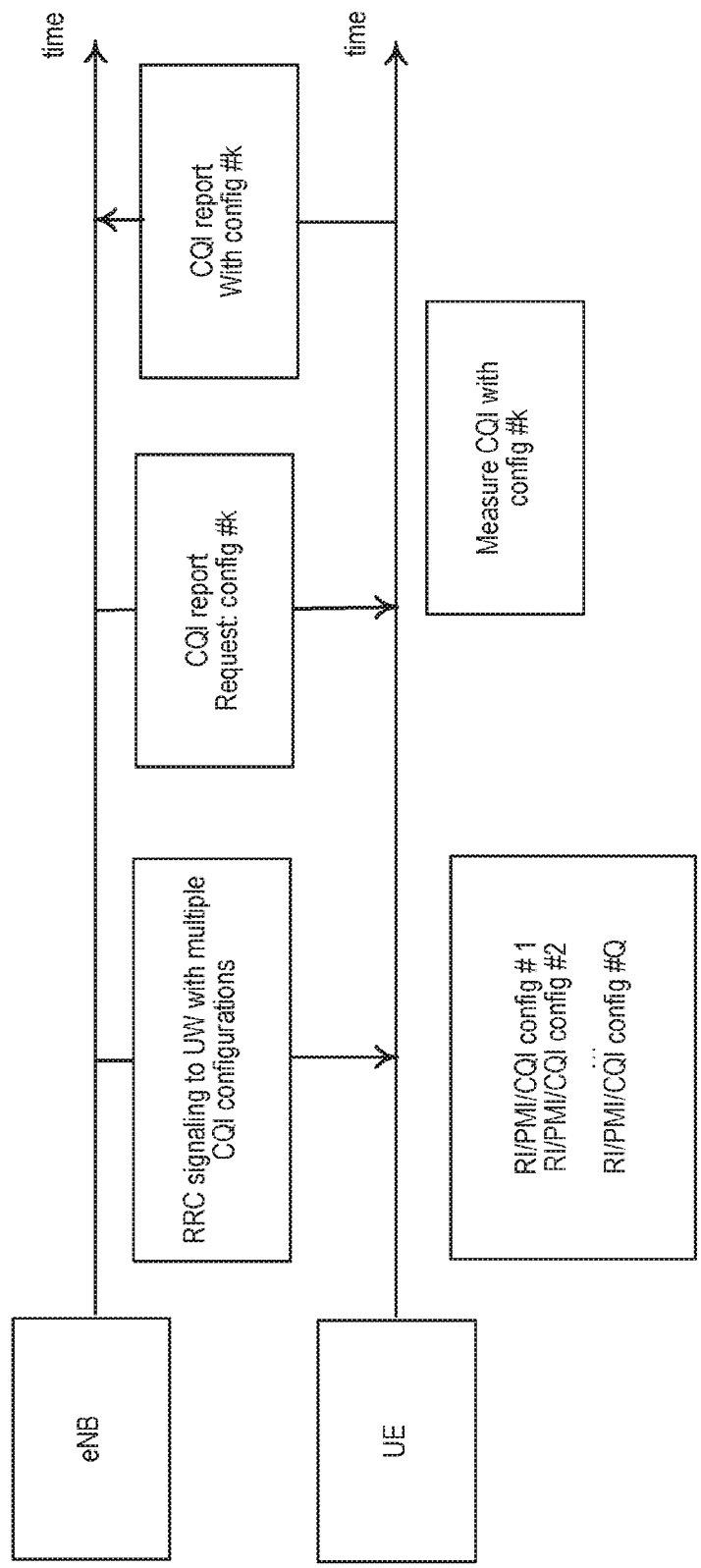
FIG. 6 illustrates a request-based CQI reporting by a UE with multiple RI/PMT/CQI configurations for MUST transmission, according to some embodiments.

Reporting multiple RI/PMI/CQIs periodically for a UE means increased uplink feedback overhead. One solution to reduce the feedback overhead is to only feedback/report the multiple configured RI/PMI/CQI when requested. In other words, a UE only reports multiple RI/PMI/CQIs when it is requested by the serving eNodeB or a network node. The request can be dynamically indicated to the UE by the eNodeB. A UE may be configured with one RI/PMI/CQI hypothesis assuming full transmit power (existing LTE CQI configuration) and with additional RI/PMI/CQI hypothesis as discussed in the previous embodiments using RRC signaling. A UE only report a new RI/PMI/CQI based on one of the additional hypothesis when requested by the eNodeB as shown in FIG. 6. The request can be triggered in a subframe by subframe basis. For example, when a potential UE pair is identified for MUST transmission, the eNodeB may send a request to the near UE for a CQI report based on a reduced transmit power to get better CQI (and/or RI) estimation for MUST transmission.

Since the CQI mismatch during MUST scheduling mainly occurs to near UEs with large transmit power reduction (i.e., the UEs that feedback higher rank CSI when assuming full transmit power allocation), the requests from the eNodeB may only be sent to near UEs and the feedback may be restricted to rank 1 PMI/CQI reports.

Figure 7:
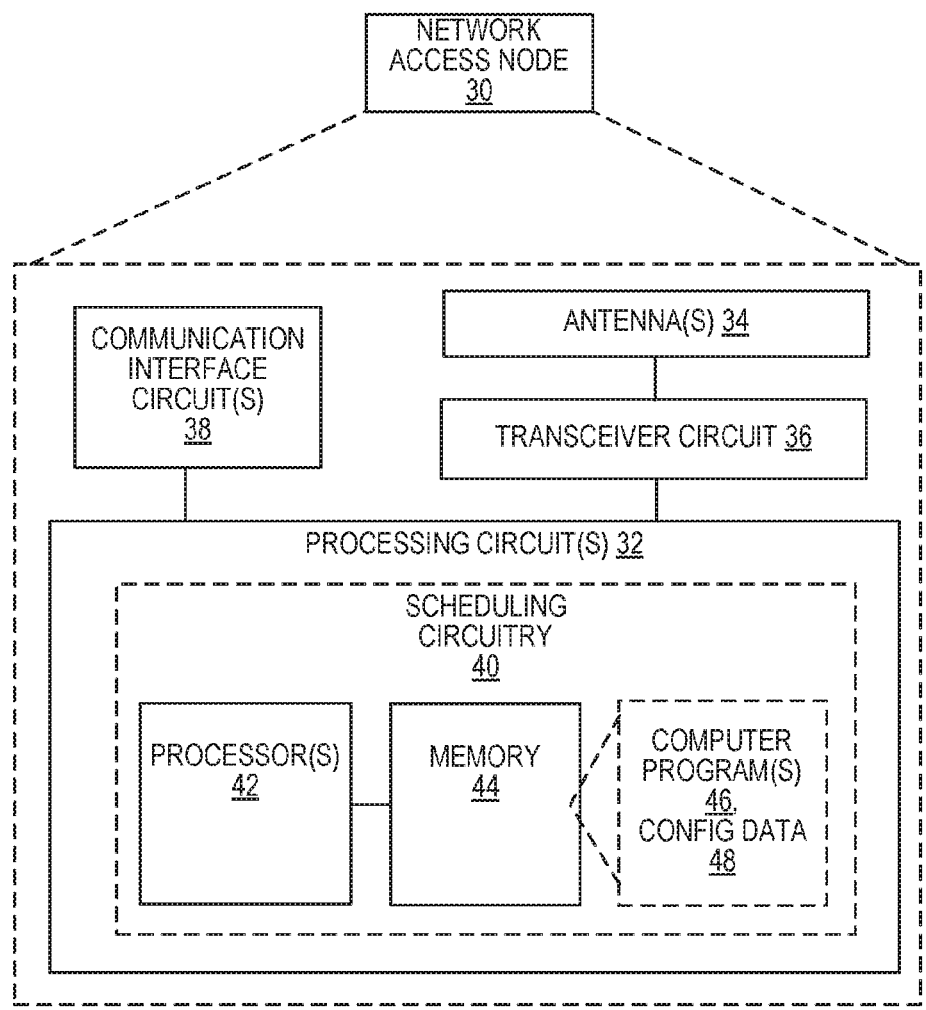
FIG. 7 illustrates a block diagram of a radio access network node, according to some embodiments.

FIG. 7 illustrates a diagram of a radio access network node 30, such as a base station or a base station operating in coordination with a base station controller, according to some embodiments. The radio access network node 30 includes one or more communication interface circuits 38 in order to communicate with network nodes or peer nodes. The radio access network node 30 provides an air interface to wireless devices, which is implemented via one or more antennas 34 and a transceiver circuit 36. The transceiver circuit 36 may include transmitter circuits, receiver circuits, and associated control circuits that are collectively configured to transmit and receive signals according to a radio access technology for the purposes of providing communication services. According to various embodiments, the radio access network node 30 can communicate with one or more peer nodes or core network nodes. The transceiver circuit 36 is configured to communicate using cellular communication services operated according to wireless communication standards (e.g. Global System for Mobile communication (GSM), General Packet Radio Services (GPRS), Wideband Code Division Multiple Access (WCDMA), High Speed Downlink Packet Access (HSDPA), LTE and LTE-Advanced).

The radio access network node 30 also includes one or more processing circuits 32 that are operatively associated with the communication interface circuit(s) 38 and/or the transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any combination thereof. More generally, the processing circuit 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of Static Random-Access Memory (SRAM), Dynamic Random-Access Memory (DRAM), Electrically Erasable Programmable Read-Only Memory (EEPROM), and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the node 30.

The radio access network node 30 is configured to support the transmission of multi-user superposition transmissions, where multi-user superposition transmission comprises transmitting, in each of a plurality of time-frequency resource elements, a modulation symbol intended for a first UE and a modulation symbol intended for a second UE, using the same antennas and the same antenna precoding. The processing circuit 32 is configured to receive multiple CSI reports from the first UE for a first reporting instance, wherein one or more of the received multiple CSI reports correspond to different possible multi-user superposition transmission states. The processing circuit 32 is configured to determine whether to use multi-user superposition transmission or an orthogonal multiple access transmission for scheduling the first UE in a first scheduling interval, based on the received multiple CSI reports. Furthermore, the processing circuit 32 is configured to perform any of the operations described in the embodiments above for the radio access network node. This functionality may be represented or carried out by scheduling circuitry 40.

Figure 8:
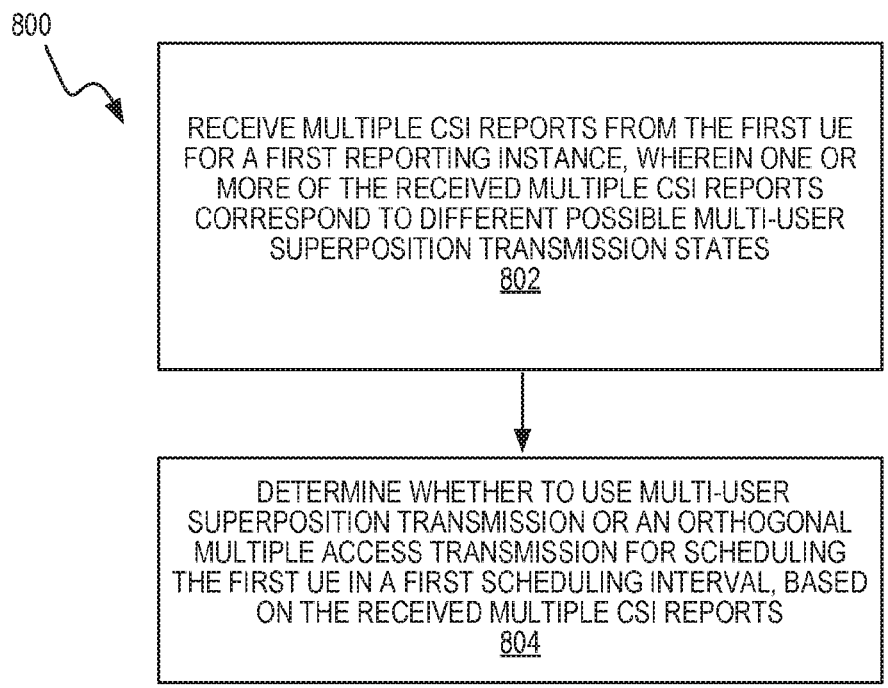
FIG. 8 illustrates a method of receiving multiple CSI reports for determining whether to use multi-user superposition transmission or an orthogonal multiple access transmission, according to some embodiments.

Regardless of the implementation, the processing circuit 32 is configured to perform operations, as described in the above embodiments. For example, the processing circuit 32 is configured to perform method 800 illustrated by the flowchart in FIG. 8. The method 800 operates in a radio access network node 30 configured to support the transmission of multi-user superposition transmissions, where multi-user superposition transmission comprises transmitting, in each of a plurality of time-frequency resource elements, a modulation symbol intended for a first LIE and a modulation symbol intended for a second UE, using the same antennas and the same antenna precoding. The method 800 includes receiving multiple CSI reports from the first UE for a first reporting instance, wherein one or more of the received multiple CSI reports correspond to different possible multi-user superposition transmission states (block 802). The method 800 also includes determining whether to use multi-user superposition transmission or an orthogonal multiple access transmission for scheduling the first UE in a first scheduling interval, based on the received multiple CSI reports (block 804).

In some cases, the first UE is sent scheduling messages or configuration messages, the configuration messages directing the first UE to provide multiple CSI reports for at least the first reporting instance.

A first one of the received multiple CSI reports may include a CQI corresponding to a full-power or substantially full-power data transmission to the first UE. Note that "first" does not limit the embodiment or the claims to any type of order or sequence of receiving CQI reports.

The radio access network node 30 then determines whether to use multi-user superposition transmission or an orthogonal multiple access transmission. According to some embodiments, this determination is made by obtaining a CSI report from a second UE, the CSI report from the second UE comprising a CQI corresponding to a full-power or substantially full-power data transmission to the second UE, determining that multi-user superposition transmission to the first and second UEs is feasible, in that transmission to both UEs can be performed using the same antennas and antenna precoding and with a power allocation such that the signal can be successfully received and decoded by both UEs.

This feasibility determination is made by determining that said CQI for the first UE is greater than said CQI for the second UE by a predetermined factor or threshold, and determining that a precoder matrix indicator, PMI, corresponding to the CSI report from the second UE matches at least one PMI corresponding to one of the received multiple CSI reports from the first UE other than said first one of the received multiple CST reports.

Obtaining the CSI report from the second UE may include transmitting, in an interference measurement resource, IMR, for the second UE, an interference component corresponding to a potential power share allocated to the first UE in a multi-user superposition transmission to the first and second UEs. The interference component is transmitted using the same antennas and the same antenna preceding intended for the multi-user superposition transmission to the first and second UEs. An antenna preceding is as a mapping of one or more signals to multiple antennas, according to preceding weights. Obtaining the CSI report may further include receiving, from the second UE, the CQI corresponding to a full-power or substantially full-power data transmission to the second UE, wherein said CQI reflects the interference component transmitted in the IMR for the second UE.

The multiple CSI reports may correspond to different power-sharing hypotheses for multi-user superposition transmission to the first UE, and/or different ranks for data transmission to the first UE. Likewise, configuration messages may indicate different power-sharing hypotheses, and/or a number of CQIs to be reported by the first UE, each CQI corresponding to a different rank for data transmission to the first UE. In further instances, the configuration messages may signal, for each desired CSI report, a corresponding transmission rank by indicating a set of precoders that are restricted to the corresponding transmission rank. Restricted precoders can mean that a precoder is for use with only one rank. Thus, if three indicated precoders are all rank-1 precoders, then it can be inferred by the UE that a CSI is wanted that is specific to rank 1. Likewise, if three indicated precoders are all rank-2 precoders, then the UE knows that a CSI specific to rank 2 is desired.

In some cases, it may be desirable to configure the UE so that it provides a mixed-rank CSI in addition to one or more rank-restricted CSIs, particularly when the maximum supportable rank is high. For instance, if there are there three CSI processes and up to four ranks, then the UE might be configured, using the above techniques, to report a rank-1 CSI for the first CSI process, a rank-2 CSI for the second CSI process, and a joint rank3-rank4 restriction on the third process.

In some embodiments, the multiple CSI reports from the first UE may also include N CSI reports, the N CSI reports comprising the N best channel quality indicators, CQIs, and wherein each of the N CSI reports includes a corresponding precoding matrix indicator, PMI, and rank indicator, RI. In some cases, signaling may indicate whether one or more of the CSI reports are for Coordinated MultiPoint, CoMP, transmissions and/or MUST transmissions.

Figure 9:
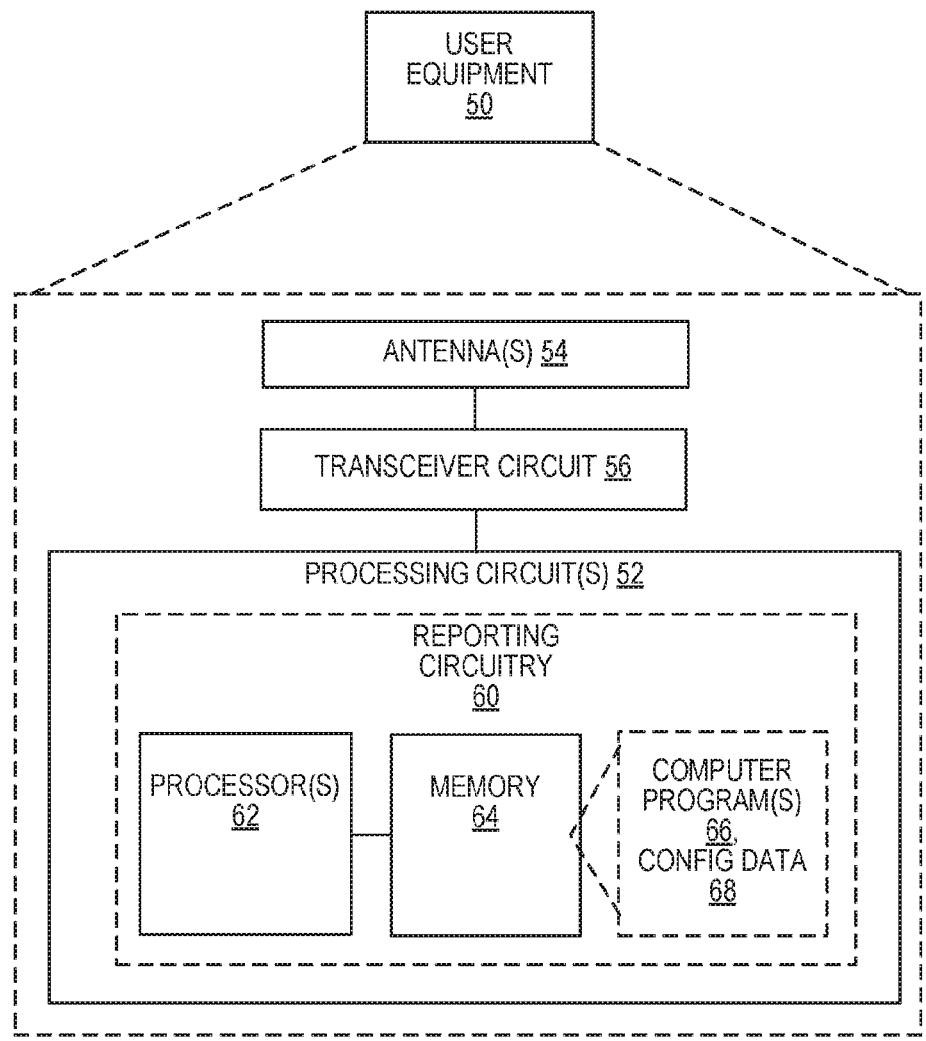
FIG. 9 illustrates a block diagram of a UE, according to some embodiments.

FIG. 9 illustrates a diagram of a wireless device, such as UE 50, according to some embodiments. To ease explanation, the user equipment 50 may also be considered to represent any wireless devices that may operate in a network. The UE 50 herein can be any type of wireless device capable of communicating with a network node or another UE over radio signals. The UE 50 may also be radio communication device, target device, device to device- (D2D), UE, machine type UE or UE capable of machine to machine communication (M2M), a sensor equipped with UE, personal digital assistant (PDA), Tablet, mobile terminal, smart phone, laptop embedded equipped (LEE), laptop mounted equipment (LME), Universal Serial Bus (USB) dongles, Customer Premises Equipment (CPE), etc.

The UE 50 communicates with a radio node or base station, such as the radio access network node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50 is configured to perform at least the modulation and demodulation techniques described above. For example, the processor 62 of the processing circuit 52 may execute a computer program 66 stored in the memory 64 that configures the processor 62 to operate as a first UE 50 configured to support the transmission of multi-user superposition transmissions, where multi-user superposition transmission comprises transmitting, in each of a plurality of time-frequency resource elements, a modulation symbol intended for the first UE 50 and a modulation symbol intended for a second UE, using the same antennas and the same antenna precoding. The processing circuit 52 is configured to send multiple CSI reports for a first reporting instance, wherein one or more of the received multiple CSI reports correspond to different possible multi-user superposition transmission states. Furthermore, the processing circuit 52 is configured to perform any of the operations described in the embodiments above for the UE. Such functionality is represented by or carried out by reporting circuitry 60.

Figure 10:
FIG. 10 illustrates a method of sending multiple CSI reports, according to some embodiments.

The processing circuit 52 of the UE 50 is configured to perform a method, such as method 1000 of FIG. 10. The method 1000 operates in a first UE, such as the UE 50, that is configured to support the transmission of multi-user superposition transmissions, where multi-user superposition transmission comprises transmitting, in each of a plurality of time-frequency resource elements, a modulation symbol intended for the first UE 50 and a modulation symbol intended for a second UE, using the same antennas and the same antenna precoding. The method 1000 includes sending multiple CSI reports for a first reporting instance, wherein one or more of the received multiple CSI reports correspond to different possible multi-user superposition transmission states (block 1002).

Figure 11:
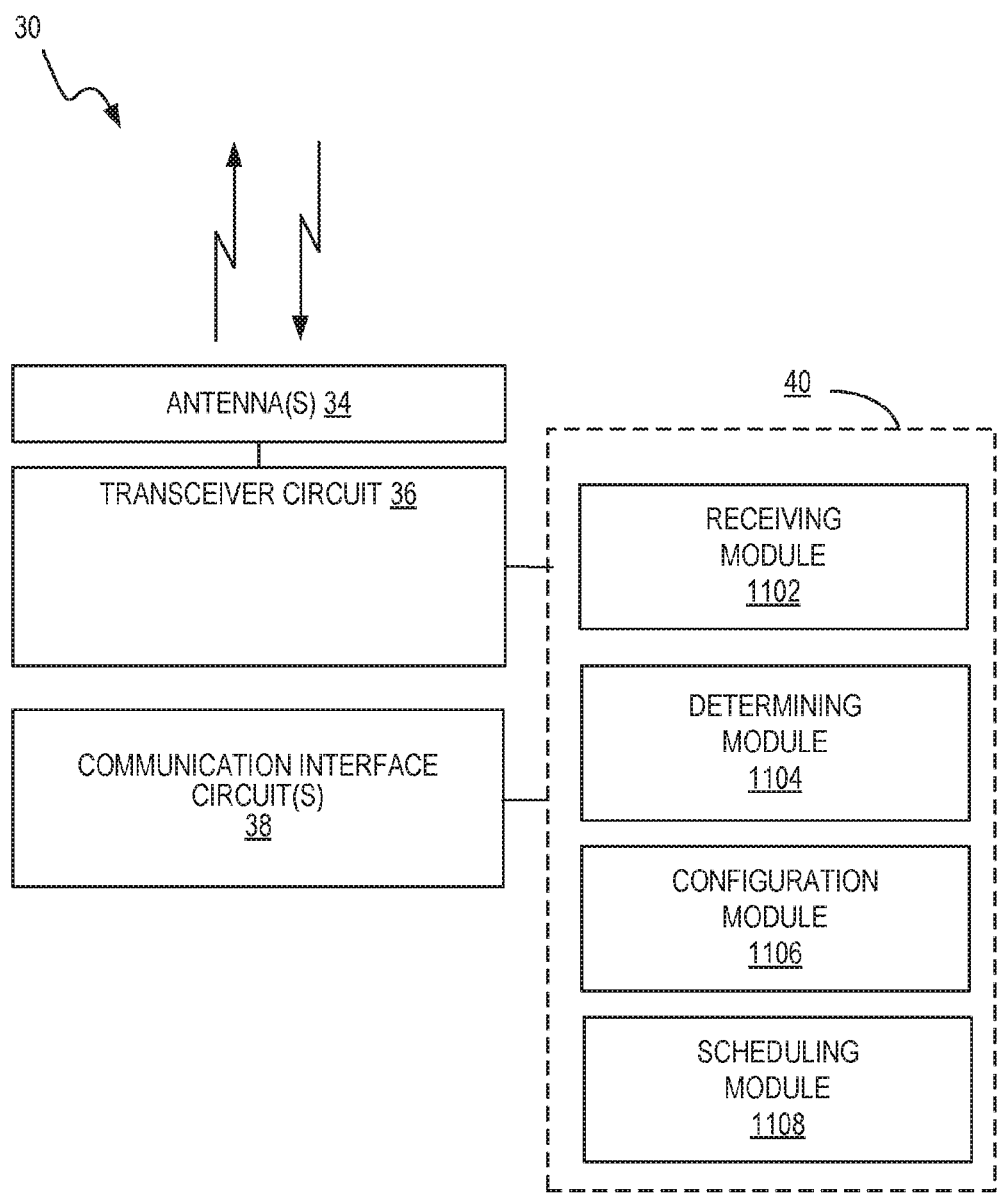
FIG. 11 illustrates an example functional implementation of a radio access network node, according to some embodiments.

FIG. 11 illustrates an example functional module or circuit architecture as may be implemented in the radio access network node 30, e.g., based on the scheduling circuitry 40. The illustrated embodiment at least functionally includes a receiving module 1102 for receiving multiple CSI reports from the first UE for a first reporting instance, wherein one or more of the received multiple CST reports correspond to different possible multi-user superposition transmission states. The implementation also includes a determining module 1104 for determining whether to use multi-user superposition transmission or an orthogonal multiple access transmission for scheduling the first UE in a first scheduling interval, based on the received multiple CSI reports.

The scheduling circuitry 40 also includes a configuration module 1106 for sending one or more configuration messages, via the transceiver circuit 36, to the first UE. In some embodiments, the one or more configuration messages direct the first UE to provide multiple CSI reports for at least the first reporting instance such that one or more of the multiple CSI reports correspond to different possible multi-user superposition transmission states for a transmission to the first UE. The scheduling circuitry still further includes a scheduling module 1108 for scheduling the first UE, based on the determination of whether to use multi-user superposition transmission or an orthogonal multiple access transmission. The scheduling module 1108 thus sends a scheduling message, via the transceiver circuit 36, to the first UE.

Figure 12:
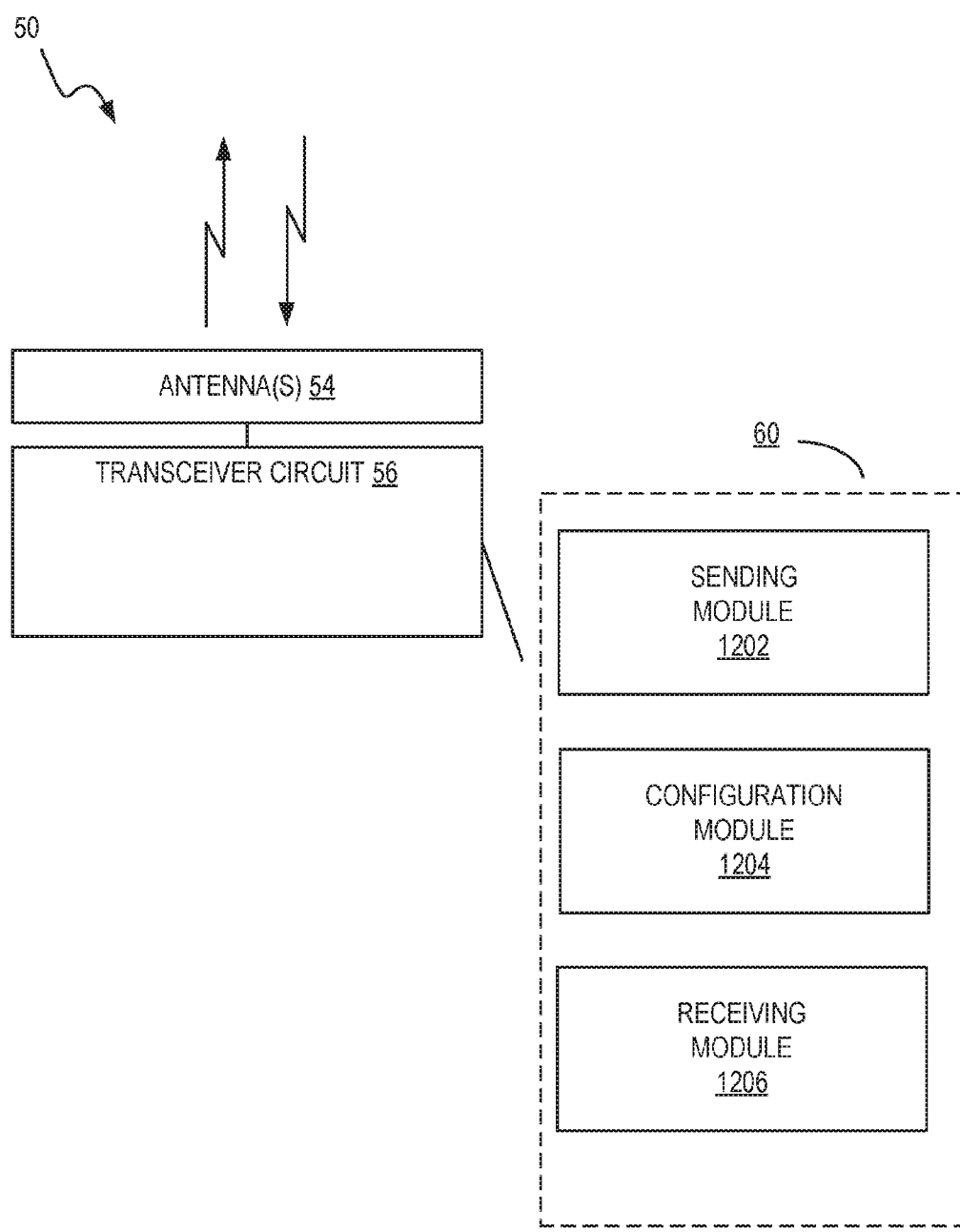
FIG. 12 illustrates an example functional implementation of a UE, according to some embodiments.

FIG. 12 illustrates an example functional module or circuit architecture as may be implemented in UE 50, e.g., based on the reporting circuitry 60. The illustrated embodiment at least functionally includes a sending module 1202 for sending multiple CSI reports for a first reporting instance, wherein one or more of the received multiple CSI reports correspond to different possible multi-user superposition transmission states. The illustrated embodiment further comprises a configuration module 1204, which in some embodiments is for receiving one or more configuration messages, the one or more configuration messages directing the first UE to provide multiple CST reports for at least the first reporting instance such that one or more of the multiple CSI reports correspond to different possible multi-user superposition transmission states for a transmission to the first UE. The illustrated embodiment still further comprise a receiving module 1206 for receiving a scheduling message based on the sent multiple CSI reports, the scheduling message scheduling a multi-user superposition transmission to the first UE.

As described in detail above, multiple CSI reports are used in various embodiments of the disclosed techniques and apparatus for identifying valid MUST pairs, calculating near UE's MUST scheduling SINR, and computing the MUST proportional fair scheduling metrics. As a result, the problems of rank mismatch, CQI mismatch, and PMI mismatch are alleviated in this solution. In addition, the proposed solution also supports dynamic switching between OMA and MUST modes. Additionally, some embodiments of the proposed solution can be implemented in an LTE standard transparent manner.

In additional or alternative embodiments, a single CSI report is also conceivable, for example in form of a method, in a radio access network node configured to support the transmission of multi-user superposition transmissions, where multi-user superposition transmission comprises transmitting, in each of a plurality of time-frequency resource elements, a modulation symbol intended for a first user equipment, UE, and a second modulation symbol intended for a second UE, using the same antennas and the same antenna precoding. The method comprises receiving a CSI report from the first UE, wherein the received CSI report assumes a transmission power for a physical channel, the transmission power being lower than a minimum transmission power that is assumed when multi-user superposition transmission is not used.

Figure 13:
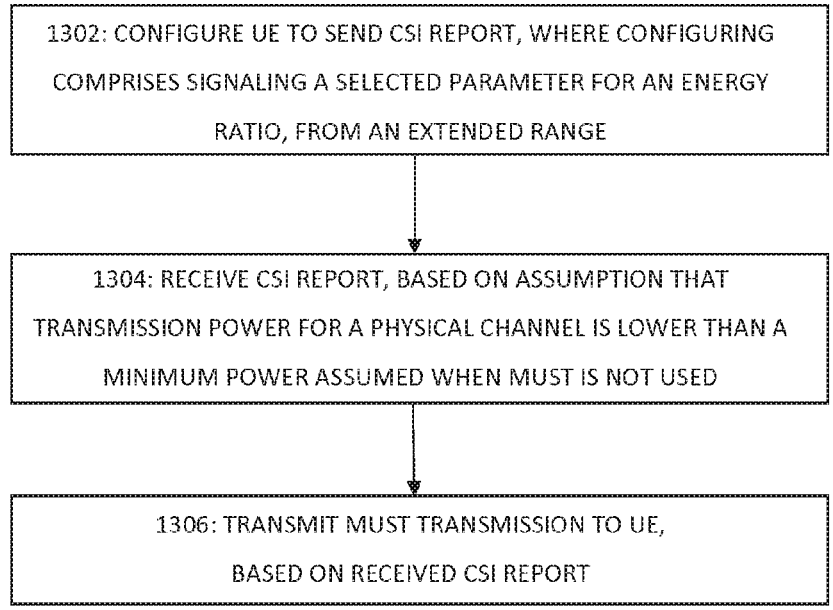
FIG. 13 is a process flow diagram illustrating an example method according to some embodiments.

FIG. 13 illustrates a process flow 1300 according to this additional or alternative embodiment. As shown at block 1304, the illustrated method comprises receiving a CSI report from the first UE, the received CSI report being based on an assumption that a transmission power for a physical channel is lower than a minimum transmission power that is assumed when multi-user superposition transmission is not used. As shown at block 1306, the method further comprises transmitting a multi-user superposition transmission to the UE, where the transmitting is based on the received CSI report. As discussed above, CSI reporting according to the techniques described herein may be facilitated by providing for an extended range for one or more parameters provided to the UE in configuration messages, where the range is extended compared to conventional signaling ranges. Thus, some embodiments of the method shown in FIG. 13 comprise configuring the UE to send the CSI report, where said configuring comprises signaling a selected parameter indicating a ratio of a PDSCH energy per resource element to a CSI reference symbol (CSI-RS) energy per resource element, wherein the selected parameter is selected from a range having a minimum value corresponding to a ratio below −8 dB, e.g., somewhere between −8 dB and −19 dB, such as −13 dB. Alternatively or additionally, the configuring may comprise signaling a selected parameter indicating a ratio of a PDSCH energy per resource element to a cell-specific reference symbol (CRS) energy per resource element, where the selected parameter is selected from an extended range having a minimum value corresponding to a ratio below −6 dB, e.g., corresponding to a ratio of about −19.21 dB. This configuration step is illustrated at block 1302 of FIG. 13.

It will be appreciated that the method shown in FIG. 13 may be carried out by the radio access network node 30 illustrated in FIGS. 7 and 11, for example, and more specifically using at least the transceiver circuit 36, receiving module 1102, and configuration module 1106.

Figure 14:
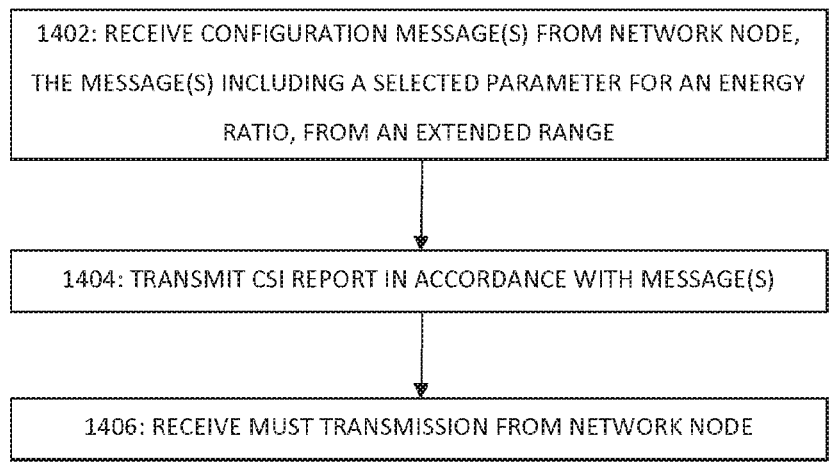
FIG. 14 is a process flow diagram illustrating another example method according to some embodiments.

FIG. 14 illustrates a corresponding method 1400 as implemented in a UE configured to support the transmission of multi-user superposition transmissions. As shown at block 1402, the illustrated method comprises receiving one or more configuration messages from a radio access network node, the one or more configuration messages directing the UE to transmit a CSI report. These one or more configuration messages comprise at least one of (a) a selected parameter indicating a ratio of a PDSCH energy per resource element to a CSI-RS energy per resource element, where the selected parameter is selected from a range having a minimum value corresponding to a ratio below −8 dB, such as somewhere between −8 dB and −19 dB or (b) a selected parameter indicating a ratio of a PDSCH energy per resource element to a CRS energy per resource element, where the selected parameter is selected from an extended range having a minimum value corresponding to a ratio below −6 dB, e.g., about −19.2 dB.

The illustrated method further comprises transmitting a CSI report, in accordance with the one or more configuration messages, as shown at block 1404, and receiving a multi-user superposition transmission from the radio access network node, as shown at block 1406. Once again, it will be appreciated that the method shown in FIG. 14 may be carried out by the UE 50 illustrated in FIGS. 9 and 12, for example, and more specifically using at least the transceiver circuit 56, receiving module 1206, and configuration module 1204.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a radio access network node configured to support the transmission of multi-user superposition transmissions, where multi-user superposition transmission comprises transmitting, in each of a plurality of time-frequency resource elements, a modulation symbol intended for a first user equipment (UE) and a modulation symbol intended for a second UE, using the same antennas and the same antenna precoding, the method comprising:
   receiving multiple channel-state information (CSI) reports from the first UE for a first reporting instance, wherein one or more of the received multiple CSI reports correspond to one or more respective multi-user superposition transmission states; and
   determining whether to use multi-user superposition transmission or an orthogonal multiple access transmission for scheduling the first UE in a first scheduling interval, based on the received multiple CSI reports.

2. A method, in a first user equipment (UE) configured to support the transmission of multi-user superposition transmissions, where multi-user superposition transmission comprises transmitting, in each of a plurality of time-frequency resource elements, a modulation symbol intended for the first UE and a modulation symbol intended for a second UE, using the same antennas and the same antenna precoding, the method comprising:

receiving one or more configuration messages, the one or more configuration messages indicating number of channel quality indicators (CQIs) to be reported by the first UE, each CQI corresponding to a different rank for data transmission to the first UE; and sending multiple CSI reports for a first reporting instance, wherein one or more of the transmitted multiple CSI reports correspond to one or more respective multi-user superposition transmission states.

3. A radio access network node configured to support the transmission of multi-user superposition transmissions, where multi-user superposition transmission comprises transmitting, in each of a plurality of time-frequency resource elements, a modulation symbol intended for a first user equipment (UE) and a modulation symbol intended for a second UE, using the same antennas and the same antenna precoding, the radio access network node comprising:

a transceiver circuit configured to send and receive transmissions; and a processing circuit configured to:

receive a channel-state information (CSI) report from the first UE, via the transceiver circuit, the received CSI report being based on an assumption that a transmission power for a physical channel is lower than a minimum transmission power that is assumed when multi-user superposition transmission is not used; and control the transceiver circuit to transmit a multi-user superposition transmission to the UE, based on the received CSI report.

4. The radio access network node of claim 3, wherein the processing circuit is configured to use the transceiver circuit to signal to the UE, for configuring the UE to send the CSI report, a selected parameter indicating a ratio of a Physical Downlink Shared Channel (PDSCH) energy per resource element to a CSI reference symbol (CSI-RS) energy per resource element, wherein the selected parameter is selected from a range having a minimum value corresponding to a ratio below −8 dB.

5. The radio access network node of claim 3, wherein the processing circuit is configured to use the transceiver circuit to signal to the UE, for configuring the UE to send the CSI report, a selected parameter indicating a ratio of a Physical Downlink Shared Channel (PDSCH) energy per resource element to a cell-specific reference symbol (CRS) energy per resource element, wherein the selected parameter is selected from an extended range having a minimum value corresponding to a ratio below −6 dB.

6. The radio access network node of claim 5, wherein the extended range has a minimum value corresponding to a ratio of about −19.21 dB.

7. A user equipment (UE) configured to support the transmission of multi-user superposition transmissions, where multi-user superposition transmission comprises transmitting, in each of a plurality of time-frequency resource elements, a modulation symbol intended for the UE and a modulation symbol intended for a second UE, using the same antennas and the same antenna precoding, the UE comprising:

a transceiver circuit configured to send and receive transmissions; and a processing circuit configured to:

receive one or more configuration messages from a radio access network node, via the transceiver circuit, the one or more configuration messages directing the UE to transmit a channel-state information (CSI) report, the one or more configuration messages comprising at least one of (a) a selected parameter indicating a ratio of a Physical Downlink Shared Channel (PDSCH) energy per resource element to a CSI reference symbol (CSI-RS) energy per resource element, wherein the selected parameter is selected from a range having a minimum value corresponding to a ratio below −8 dB, or (b) a selected parameter indicating a ratio of a Physical Downlink Shared Channel (PDSCH) energy per resource element to a cell-specific reference symbol (CRS) energy per resource element, wherein the selected parameter is selected from an extended range having a minimum value corresponding to a ratio below −6 dB;

send, using the transceiver circuit, a channel-state information (CSI) report, in accordance with the one or more configuration messages;

wherein the transceiver circuit is further configured to receive a multi-user superposition transmission from the radio access network node.

8. A radio access network node configured to support the transmission of multi-user superposition transmissions, where multi-user superposition transmission comprises transmitting, in each of a plurality of time-frequency resource elements, a modulation symbol intended for a first user equipment (UE) and a modulation symbol intended for a second UE, using the same antennas and the same antenna precoding, the radio access network node comprising:

a transceiver circuit configured to send and receive transmissions; and a processing circuit configured to:

receive, via the transceiver circuit, multiple channel-state information (CSI) reports from the first UE for a first reporting instance, wherein one or more of the received multiple CSI reports correspond to one or more respective multi-user superposition transmission states; and determine whether to use multi-user superposition transmission or an orthogonal multiple access transmission for scheduling the first UE in a first scheduling interval, based on the received multiple CSI reports.

9. The radio access network node of claim 8, wherein the processing circuit is configured to first send one or more configuration messages, via the transceiver circuit, to the first UE, the one or more configuration messages directing the first UE to provide multiple channel state information (CSI) reports for at least the first reporting instance such that one or more of the multiple CSI reports correspond to one or more respective multi-user superposition transmission states for a transmission to the first UE.

10. The radio access network node of claim 9, wherein the multiple CSI reports are received on request, in response to the one or more configuration messages.

11. The radio access network node of claim 8, wherein the processing circuit is configured to schedule the first UE based on said determining whether to use multi-user superposition transmission or an orthogonal multiple access transmission, and to send a scheduling message, via the transceiver circuit, to the first UE.

12. The radio access network node of claim 8, wherein a first one of the received multiple CSI reports comprises a channel quality indicator (CQI) corresponding to a full-power or substantially full-power data transmission to the first UE, and wherein the processing circuit is configured to determine whether to use multi-user superposition transmission or an orthogonal multiple access transmission by being configured to:
  obtain a CSI report from a second UE, the CSI report from the second UE comprising a CQI corresponding to a full-power or substantially full-power data transmission to the second UE; and
  determine that multi-user superposition transmission to the first and second UEs is feasible by being configured to
  determine that said CQI for the first UE is greater than said CQI for the second UE by a predetermined factor or threshold, and
  determine that a precoder matrix indicator (PMI) corresponding to the CSI report from the second UE matches at least one PMI corresponding to one of the received multiple CSI reports from the first UE other than said first one of the received multiple CSI reports.

13. The radio access network node of claim 12, wherein the processing circuit is configured to obtain the CSI report from the second UE by being configured to:
  transmit, in an interference measurement resource (IMR) for the second UE, an interference component corresponding to a potential power share allocated to the first UE in a multi-user superposition transmission to the first and second UEs, wherein said interference component is transmitted using the same antennas and the same antenna precoding intended for the multi-user superposition transmission to the first and second UEs; and
  receive, from the second UE, said CQI corresponding to a full-power or substantially full-power data transmission to the second UE, wherein said CQI reflects the interference component transmitted in the IMR for the second UE.

14. The radio access network node of claim 8, wherein the received multiple CSI reports from the first UE correspond to different power-sharing hypotheses for multi-user superposition transmission to the first UE.

15. The radio access network node of claim 14, wherein one or more configuration messages sent to the first UE indicate one or more of the different power-sharing hypotheses.

16. The radio access network node of claim 8, wherein the received multiple CSI reports from the first UE correspond to different ranks for data transmission to the first UE.

17. The radio access network node of claim 16, wherein one or more configuration messages sent to the first UE indicate a number of channel quality indicators (CQIs) to be reported by the first UE, each CQI corresponding to a different rank for data transmission to the first UE.

18. The radio access network node of claim 17, wherein one or more configuration messages sent to the first UE indicate the number of CQIs to be reported by the first UE by indicating, for each desired CSI report, a corresponding transmission rank by indicating a set of precoders that are restricted to the corresponding transmission rank.

19. The radio access network node of claim 8, wherein the received multiple CSI reports from the first UE comprise N CSI reports, the N CSI reports comprising the N best channel quality indicators (CQIs) and wherein each of the N CSI reports includes a corresponding precoding matrix indicator (PMI) and rank indicator (RI).

20. A first user equipment (UE) configured to support the transmission of multi-user superposition transmissions, where multi-user superposition transmission comprises transmitting, in each of a plurality of time-frequency resource elements, a modulation symbol intended for the first UE and a modulation symbol intended for a second UE, using the same antennas and the same antenna precoding, the first UE comprising:
  a transceiver circuit configured to send and receive transmissions; and
  a processing circuit configured to:
    receive one or more configuration messages, the one or more configuration messages indicating number of channel quality indicators (CQIs) to be reported by the first UE, each CQI corresponding to a different rank for data transmission to the first UE; and
    send, via the transceiver circuit, multiple CSI reports for a first reporting instance, wherein one or more of the transmitted multiple CSI reports correspond to one or more respective multi-user superposition transmission states.

21. The first UE of claim 20, wherein the one or more configuration messages direct the first UE to provide multiple channel state information (CSI) reports for at least the first reporting instance such that one or more of the multiple CSI reports correspond to one or more respective multi-user superposition transmission states for a transmission to the first UE.

22. The first UE of claim 21, wherein the processing circuit is configured to send the multiple CSI reports on request, in response to receiving the one or more configuration messages.

23. The first UE of claim 20, wherein the processing circuit is configured to receive a scheduling message based on the sent multiple CSI reports, the scheduling message scheduling a multi-user superposition transmission to the first UE.

24. The first UE of claim 20, wherein a first one of the sent multiple CSI reports comprises a channel quality indicator (CQI) corresponding to a full-power or substantially full-power data transmission to the first UE.

25. The first UE of claim 20, wherein the sent multiple CSI reports correspond to different power-sharing hypotheses for multi-user superposition transmission to the first UE.

26. The first UE of claim 25, wherein one or more configuration messages received by the first UE indicate one or more of the different power-sharing hypotheses.

27. The first UE of claim 20, wherein the sent multiple CSI reports correspond to different ranks for data transmission to the first UE.

28. The first UE of claim 20, wherein the one or more configuration messages received by the first UE indicate the number of CQIs to be reported by the first UE by indicating, for each desired CSI report, a corresponding transmission rank by indicating a set of precoders that are restricted to the corresponding transmission rank.

29. The first UE of claim 20, wherein the sent multiple CSI reports comprise N CSI reports, the N CSI reports comprising the N best channel quality indicators (CQIs) and wherein each of the N CSI reports includes a corresponding precoding matrix indicator (PMI) and rank indicator (RI).

* * * * *